United States Patent
Lee et al.

(10) Patent No.: US 10,873,843 B2
(45) Date of Patent: Dec. 22, 2020

(54) METHOD FOR TRANSMITTING/RECEIVING D2D SIGNAL IN WIRELESS COMMUNICATION SYSTEM AND APPARATUS THEREFOR

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/521,121

(22) PCT Filed: Oct. 21, 2015

(86) PCT No.: PCT/KR2015/011156
§ 371 (c)(1),
(2) Date: Apr. 21, 2017

(87) PCT Pub. No.: WO2016/064193
PCT Pub. Date: Apr. 28, 2016

(65) Prior Publication Data
US 2017/0339511 A1    Nov. 23, 2017

Related U.S. Application Data

(60) Provisional application No. 62/066,890, filed on Oct. 21, 2014, provisional application No. 62/076,468, (Continued)

(51) Int. Cl.
*H04W 4/70*  (2018.01)
*H04L 5/00*  (2006.01)
(Continued)

(52) U.S. Cl.
CPC ............. *H04W 4/70* (2018.02); *H04L 5/0048* (2013.01); *H04L 5/0053* (2013.01);
(Continued)

(58) Field of Classification Search
None
See application file for complete search history.

(56) References Cited

U.S. PATENT DOCUMENTS

2011/0151887 A1    6/2011  Hakola et al.
2011/0255450 A1*  10/2011  Wang ................ H04W 72/0493
                                                370/280

(Continued)

FOREIGN PATENT DOCUMENTS

CN    103002578 A    3/2013
CN    104041099 A    9/2014
(Continued)

OTHER PUBLICATIONS

3GPP TSG RAN WG1 Meeting #77 Seoul, Korea, May 19-23, 2014, Sharp, "Collision Avoidance Mechanism with Cellular Network for D2D Communication" (Year: 2014).*
(Continued)

*Primary Examiner* — Jamaal Henson
(74) *Attorney, Agent, or Firm* — Birch, Stewart, Kolasch & Birch, LLP

(57) ABSTRACT

The present invention relates to a method and an apparatus for receiving a device-to-device (D2D) signal by a first terminal having a single RX chain in a wireless communication system. Specifically, the present invention comprises the steps of: receiving a reference synchronization window value related to a first cell for wide area network (WAN) communication and a second cell for D2D communication; determining a first D2D signal search area by applying the reference synchronization window value to a discovery
(Continued)

pool; and setting a particular gap for a first resource area which precedes, and is located adjacent to, the first D2D signal search area and for a second resource area which follows, and is located adjacent to, the first D2D signal search area, wherein the particular gap is a time interval set for allowing the single RX chain to cover a switching operation between the WAN communication and the D2D communication.

12 Claims, 14 Drawing Sheets

Related U.S. Application Data filed on Nov. 6, 2014, provisional application No. 62/086,175, filed on Dec. 1, 2014, provisional application No. 62/146,177, filed on Apr. 10, 2015, provisional application No. 62/077,888, filed on Nov. 10, 2014, provisional application No. 62/080,253, filed on Nov. 14, 2014, provisional application No. 62/150,869, filed on Apr. 22, 2015, provisional application No. 62/154,738, filed on Apr. 30, 2015, provisional application No. 62/161,853, filed on May 14, 2015.

(51) Int. Cl.
*H04W 56/00* (2009.01)
*H04W 72/12* (2009.01)
*H04W 72/04* (2009.01)
*H04W 92/18* (2009.01)
*H04W 72/08* (2009.01)
*H04W 84/12* (2009.01)

(52) U.S. Cl.
CPC ......... *H04L 5/0091* (2013.01); *H04W 56/001* (2013.01); *H04W 72/042* (2013.01); *H04W 72/0446* (2013.01); *H04W 72/12* (2013.01); *H04W 72/044* (2013.01); *H04W 72/082* (2013.01); *H04W 84/12* (2013.01); *H04W 92/18* (2013.01)

(56) References Cited

U.S. PATENT DOCUMENTS

| | | | | |
|---|---|---|---|---|
| 2013/0083753 A1* | 4/2013 | Lee | | H04W 72/0453 370/329 |
| 2013/0148566 A1* | 6/2013 | Doppler | | H04W 76/40 370/312 |
| 2013/0176995 A1* | 7/2013 | Park | | H04W 72/06 370/336 |
| 2013/0273924 A1* | 10/2013 | Hakola | | H04W 76/14 455/450 |
| 2013/0315215 A1* | 11/2013 | Beale | | H04W 36/22 370/336 |
| 2013/0322413 A1* | 12/2013 | Pelletier | | H04W 76/14 370/336 |
| 2014/0016428 A1* | 1/2014 | Akai | | B29B 7/845 366/76.2 |
| 2014/0056220 A1* | 2/2014 | Poitau | | H04W 76/14 370/328 |
| 2014/0086153 A1 | 3/2014 | Bontu et al. | | |
| 2014/0148177 A1* | 5/2014 | Ratasuk | | H04W 72/02 455/450 |
| 2014/0161095 A1 | 6/2014 | Nan et al. | | |
| 2014/0198680 A1* | 7/2014 | Siomina | | H04L 5/14 370/252 |
| 2014/0233476 A1* | 8/2014 | Kwak | | H04W 72/0413 370/329 |
| 2014/0321377 A1* | 10/2014 | Ryu | | H04W 72/1247 370/329 |
| 2014/0321402 A1* | 10/2014 | Wang | | H04W 72/04 370/329 |
| 2014/0328329 A1* | 11/2014 | Novlan | | H04W 56/0015 370/336 |
| 2014/0334354 A1* | 11/2014 | Sartori | | H04L 5/0094 370/280 |
| 2015/0009910 A1* | 1/2015 | Ryu | | H04W 72/04 370/329 |
| 2015/0016428 A1* | 1/2015 | Narasimha | | H04L 5/0058 370/336 |
| 2015/0098416 A1* | 4/2015 | Kuo | | H04W 72/04 370/329 |
| 2015/0098422 A1* | 4/2015 | Sartori | | H04W 8/005 370/329 |
| 2015/0289253 A1 | 10/2015 | Pan et al. | | |
| 2015/0327240 A1 | 11/2015 | Yamada et al. | | |
| 2016/0014794 A1 | 1/2016 | Wu | | |
| 2016/0021625 A1 | 1/2016 | Li et al. | | |
| 2016/0112858 A1* | 4/2016 | Nguyen | | H04W 8/005 370/329 |
| 2016/0204885 A1 | 7/2016 | Sorrentino et al. | | |
| 2016/0205717 A1* | 7/2016 | Kazmi | | H04W 76/15 455/435.2 |
| 2016/0227496 A1 | 8/2016 | Panteleev et al. | | |
| 2016/0295620 A1* | 10/2016 | Lindoff | | H04W 8/005 |
| 2017/0013578 A1 | 1/2017 | Wei et al. | | |
| 2017/0078863 A1 | 3/2017 | Kim et al. | | |
| 2017/0150501 A1 | 5/2017 | Park | | |
| 2017/0295585 A1 | 10/2017 | Sorrentino et al. | | |
| 2018/0279396 A1* | 9/2018 | Sorrentino | | H04W 56/0025 |

FOREIGN PATENT DOCUMENTS

| | | |
|---|---|---|
| JP | 2013-530570 A | 7/2013 |
| KR | 10-2009-0004666 A | 1/2009 |
| WO | WO 2011/130626 A1 | 10/2011 |
| WO | WO 2013/091229 A1 | 6/2013 |
| WO | WO 2014/129844 A1 | 8/2014 |
| WO | WO 2014/168571 A2 | 10/2014 |

OTHER PUBLICATIONS

3GPP TS 22.368 v12.2.0 (Mar. 2013) 3rd Generation Partnership Project; Technical Specification Group Services and System Aspects; Service Requirements for Machine-Type Communications (MTC); Stage 1 Release 12. (Year: 2013).*
Ericsson, "On D2D Gaps", 3GPP TSG-RAN WG2 #91bis Malmo, Sweden Oct. 5-9, 2015, Technical Document R2-154156, (Year: 2015).*
LG, "Remaining Details on DL Gap for D2D Discovery", Oct. 2014, R1-144884 (Year: 2014).*
LG/Qualcomm, "WF on Remaining Details on DL Gap for D2D Discovery", Nov. 17, 2014, R1-145257 (Year: 2014).*
Ericsson, "Inter-Carrier Aspects of D2D Discovery and Communication," 3GPP TSG RAN WG1 Meeting #78bis, R1-144320, Ljubljana, Slovenia, Oct. 6-10, 2014, 7 pages.
Ericsson, "On Scheduling Assignments and Receiver Behaviour," 3GPP TSG-RAN WG1 Meeting #76bis, R1-141391, Shenzhen, China, Mar. 31-Apr. 4, 2014, 6 pages.
Ericsson, "Receiver Behaviour for D2D Synchronization," 3GPP TSG RAN WG1 Meeting #78bis, R1-144321, Ljubljana, Slovenia, Oct. 6-10, 2014, 3 pages.
Intel Corporation, "On D2DSS Transmissions for Inter-Cell D2D Discovery," 3GPP TSG RAN WG1 Meeting #78bis, R1-143758, Ljubljana, Slovenia, Oct. 6-10, 2014, pp. 2-7 (7 pages total).
Intel Corporation, "Resource Allocation for Mode-2 D2D Operation," 3GPP TSG RAN WG1 Meeting #78, R1-142871, Dresden, Germany, Aug. 18-24, 2014, pp. 1-10.
ITL Inc., "Multiplexing Between D2D and WAN in a FDD Band," 3GPP TSG RAN WG1 Meeting #78bis, R1-144254, Ljubljana, Slovenia, Oct. 6-10, 2014, 7 pages.
LG Electronics, "Details of Resource Allocation for D2D Synchronization," 3GPP TSG RAN WG1 Meeting #78bis, R1-144014, Ljubljana, Slovenia, Oct. 6-10, 2014, pp. 1-5.

(56) References Cited

OTHER PUBLICATIONS

LG Electronics, "Evaluation Results on the D2D Synchronization Procedure," 3GPP TSG RAN WG1 Meeting #78bis, R1-144019, Ljubljana, Slovenia, Oct. 6-10, 2014, pp. 1-10.

LG Electronics, "Further Discussion on the Multi-Carrier Issues in D2D," 3GPP TSG RAN WG1 Meeting #78bis, R1-144030, Ljubljana, Slovenia, Oct. 6-10, 2014, pp. 2-5 (5 pages total).

Samsung, "Synchronization Procedure for D2D Discovery and Communication," 3GPP TSG RAN WG1 Meeting #78bis, R1-143854, Ljubljana, Slovenia, Oct. 6-10, 2014, 9 pages.

Ericsson et al., "WF on UE Receiver Behavior for D2D Discovery," AI 7.2.1.2.6, R1-144361, Oct. 9, 2014, 2 pages, XP050896102.

Ericsson, "Transmitter Behaviour for D2D Synchronization," 3GPP TSG RAN WG1 Meeting #78bis, R1-144322, Ljubljana, Slovenia, Oct. 6-10, 2014 (Oct. 5, 2014), 7 pages, XP050875577.

Huawei et al., "Final Details of D2D Synchronization Signals," 3GPP TSG RAN WG1 Meeting #78bis, R1-143699, Ljubljana, Slovenia, Oct. 6-10, 2014 (Oct. 5, 2014), 11 pages, XP050895026.

ITRI, "Conditions of D2DSS Transmission Considering the Timing-forward," 3GPP TSG RAN WG1 Meeting #78bis, R1-143901, Ljubljana, Slovenia, Oct. 6-10, 2014, 3 pages.

LG Electronics, "Details of Conditions for D2DSS Transmissions," 3GPP TSG RAN WG1 Meeting #78bis, R1-144016, Ljubljana, Slovenia, Oct. 6-10, 2014, pp. 1-5.

LG Electronics, "Discussion on Resource Allocation for D2D Synchronization," 3GPP TSG RAN WG1 Meeting #76bis, R1-141356, Shenzhen, China, Mar. 31-Apr. 4, 2014, pp. 1-4.

LG Electronics, "Evaluation Results on the D2D Synchronization Procedure," 3GPP TSG RAN WG1 Meeting #78, R1-143191, Dresden, Germany, Aug. 18-22, 2014 (Aug. 17, 2014), pp. 1-6, XP050788668.

LG Electronics, "On the D2D-related Information Sharing between In-coverage UEs and Out-coverage UEs," 3GPP TSG RAN WG1 Meeting #77, R1-142158, Seoul, Korea, May 19-23, 2014, pp. 1-5.

MCC Support, "Draft Report of 3GPP TSG RAN WG1 #78bis v0.2.0 (Ljubljana, Slovenia, Oct. 6-10, 2014)," 3GPP TSG RAN WG1 Meeting #79, R1-14xxxx, San Francisco, USA, Nov. 17-21, 2014 (Oct. 15, 2014), pp. 1-88, XP050895467.

Sharp, "D2D and WAN Co-existence Considerations and D2D Subframe Bitmap Limitations," 3GPP TSG RAN WG1 Meeting #78bis, R1-143795, Ljubljana, Slovenia, Oct. 6-10, 2014 (Oct. 5, 2014), pp. 1-4, XP050875115.

ZTE, "Synchronization Design for D2D Broadcast Communication," 3GPP TSG-RAN WG1 #76, R1-140269, Prague, Czech Republic, Feb. 10-14, 2014 (Feb. 9, 2014), pp. 1-2 to 11-2, XP050735819.

Intel Corporation, "Discussion on Type 2 D2D Discovery Procedure", 3GPP TSG RAN WG1 Meeting #77, R1-142033, Seoul, Korea, May 19-23, 2014, pp. 1-5.

Intel Corporation, "Type 1 Resource Allocation for D2D Discovery", 3GPP TSG-RAN2 Meeting #84, R2-134285, San Francisco, USA Nov. 11-15, 2013, pp. 1-5.

Kyocera, "Inter-Frequency Discovery Considerations", 3GPP TSG-RAN WG2 #86, R2-142240, Seoul, Republic of Korea, May 19-23, 2014, 10 pages.

Qualcomm Incorporated, "RRM Requirements for D2D", 3GPP TSG-RAN WG4 #72bis, R4-145742, Singapore, Oct. 6-10, 2014, pp. 1-6.

Samsung, "RSRP Based Resource Grouping for D2D Type-1 Discovery", 3GPP TSG RAN WG1 #78, R1-143093, Dresden, Germany, Aug. 18-22, 2014, pp. 1-7.

"D2D Synchronization Procedure," 3GPP TSG RAN WG1 Meeting #77, R1-142062, Seoul, Korea, May 19-23, 2014, pp. 1-7 (5 pages total).

Interdigital, "Synchronization signal and channel design for D2D", 3GPP TSG-RAN WG1 Meeting #77, R1-142352, May 19-23, 2014, Seoul, Korea, 3 pages.

* cited by examiner

FIG. 2
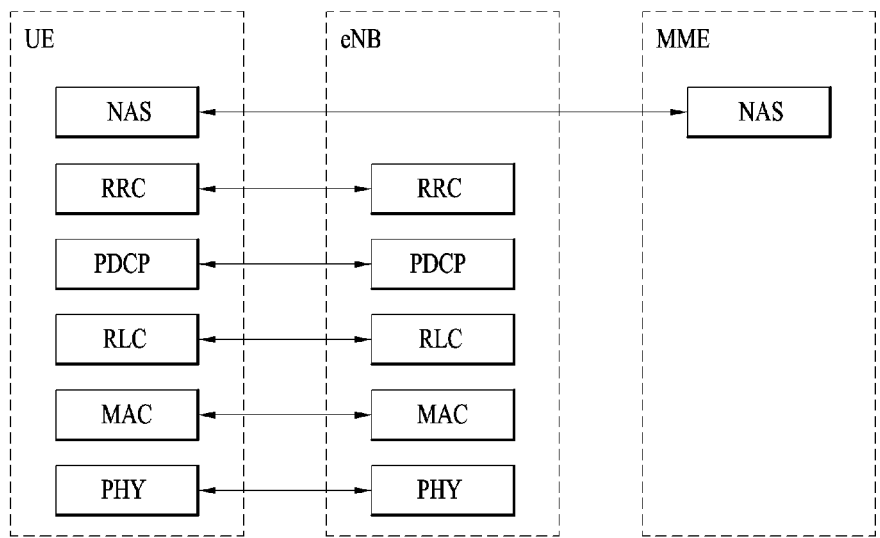
(a) Control-Plane Protocol Stack
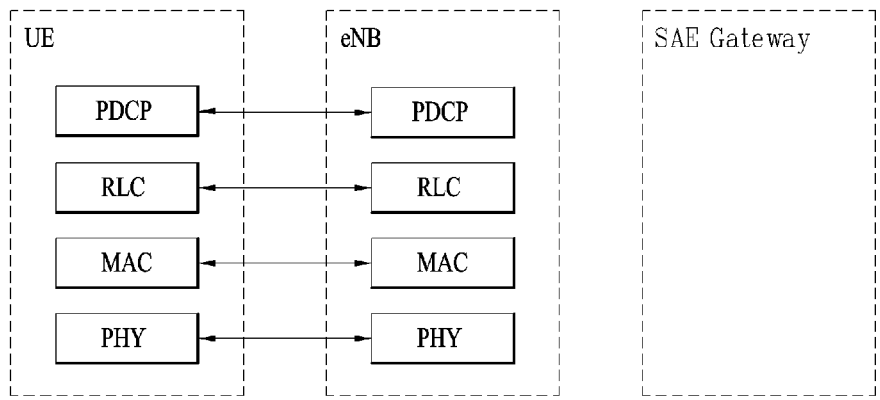
(b) User-Plane Protocol Stack FIG. 8
(a) 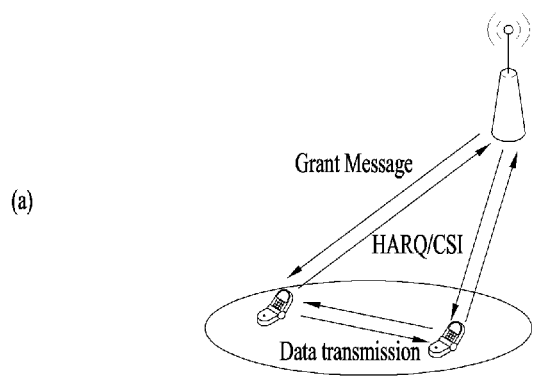
(b) 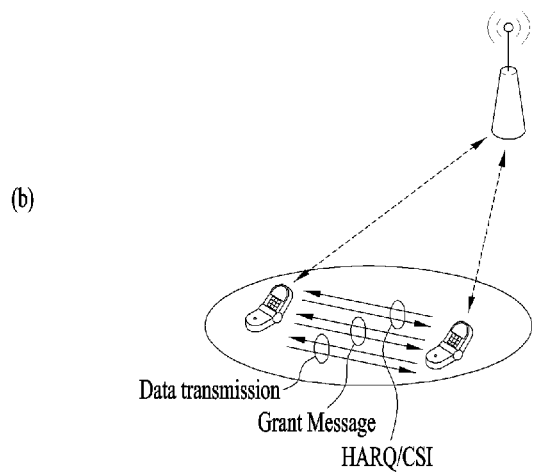

FIG. 13
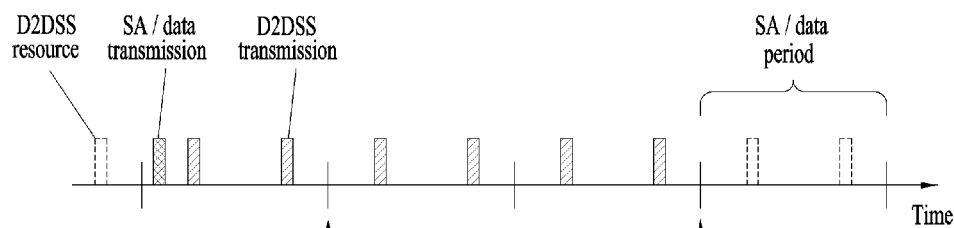
Option 1-1 based on D2DSS transmission timer
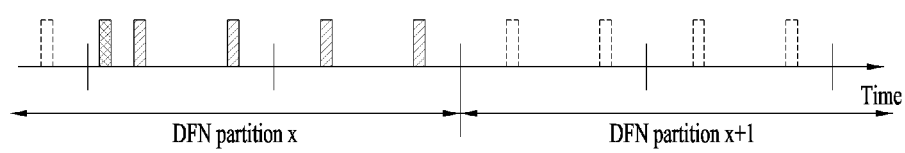
Option 1-2 based on DFN range partitioning
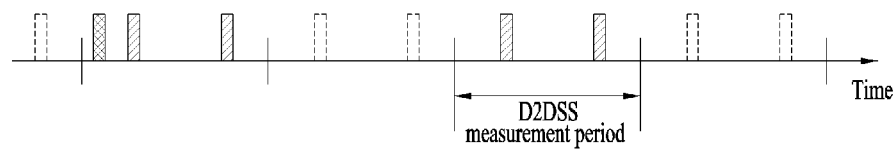
Option 1-3 based on D2DSS measurement period

METHOD FOR TRANSMITTING/RECEIVING D2D SIGNAL IN WIRELESS COMMUNICATION SYSTEM AND APPARATUS THEREFOR

CROSS REFERENCE TO RELATED APPLICATIONS

This application is the National Phase of PCT International Application No. PCT/KR2015/011156, filed on Oct. 21, 2015, which claims priority under 35 U.S.C. 119(e) to U.S. Provisional Application No. 62/066,890, filed on Oct. 21, 2014, No. 62/076,468, filed on Nov. 6, 2014, No. 62/086,175, filed on Dec. 1, 2014, No. 62/146,177, filed on Apr. 10, 2015, No. 62/077,888, filed on Nov. 10, 2014, No. 62/080,253, filed on Nov. 14, 2014, No. 62/150,869, filed on Apr. 22, 2015, No. 62/154,738, filed on Apr. 30, 2015 and No. 62/161,853, filed on May 14, 2015, all of which are hereby expressly incorporated by reference into the present application.

TECHNICAL FIELD

The present invention relates to a wireless communication system and, more specifically, to a method of transmitting and receiving a D2D signal in a wireless communication system and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and basic standardization thereof is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist per base station. One cell is set to one of bandwidths of 1.44, 3, 5, 10, 15 and 20 MHz to provide a downlink or uplink transport service to several UEs. Different cells may be set to provide different bandwidths. Additionally, one base station controls data transmission and reception for a plurality of UEs. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding UE of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has evolved into LTE, request and expectation of users and providers have continued to increase. Also, since another wireless access technology is being continuously developed, new evolution of wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

An object of the present invention devised to solve the problem lies in a method of transmitting and receiving a D2D signal in a wireless communication system and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method of receiving a device-to-device (D2D) signal by a first UE with a single RX chain in a wireless communication system includes: receiving a reference synchronization window value related to a first cell for wide area network (WAN) communication and a second cell for D2D communication; deciding a first D2D signal search region to which the reference synchronization window value has been applied in a discovery pool; and setting a specific gap for a first resource area preceding and located adjacent to the first D2D signal search area and for a second resource area following and located adjacent to the first D2D signal search area, wherein the specific gap is a time interval set for allowing the single RX chain to cover a switching operation between WAN communication and D2D communication.

The method may further include receiving a D2D synchronization signal (D2DSS) in a second D2D signal search region, wherein the second D2D signal search region is set by applying the reference synchronization window value to a resource region for the D2DSS, and wherein a specific gap is set in a predetermined third resource region preceding the second D2D signal search region and a predetermined fourth resource region following the second D2D signal search region.

The D2DSS may be transmitted before the discovery pool.

The D2DSS may be transmitted within a predetermined range before the discovery pool (scheduling assignment pool).

In another aspect of the present invention, D2D of a first UE having a single RX chain in a wireless communication system includes: a radio frequency unit; and a processor, wherein the processor is configured to receive a reference synchronization window value related to a first cell for WAN communication and a second cell for D2D communication, to determine a first D2D signal search region to which the reference synchronization window value has been applied in a discovery pool, and to set a specific gap for a first resource area preceding and located adjacent to the first D2D signal search area and for a second resource area following and located adjacent to the first D2D signal search area, wherein the specific gap is a time interval set for allowing the single RX chain to cover a switching operation between WAN communication and D2D communication.

Advantageous Effects

According to embodiments of the present invention, transmission and reception of a D2D signal can be efficiently performed in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 2 illustrates structures of a control plane and a user plane of a radio interface protocol between a UE and an E-UTRAN based on the 3GPP radio access network standard;

FIG. 8 is a reference diagram illustrating D2D communication;

FIG. 13 is a reference diagram illustrating options related to the present invention.

BEST MODE

Figure 1:
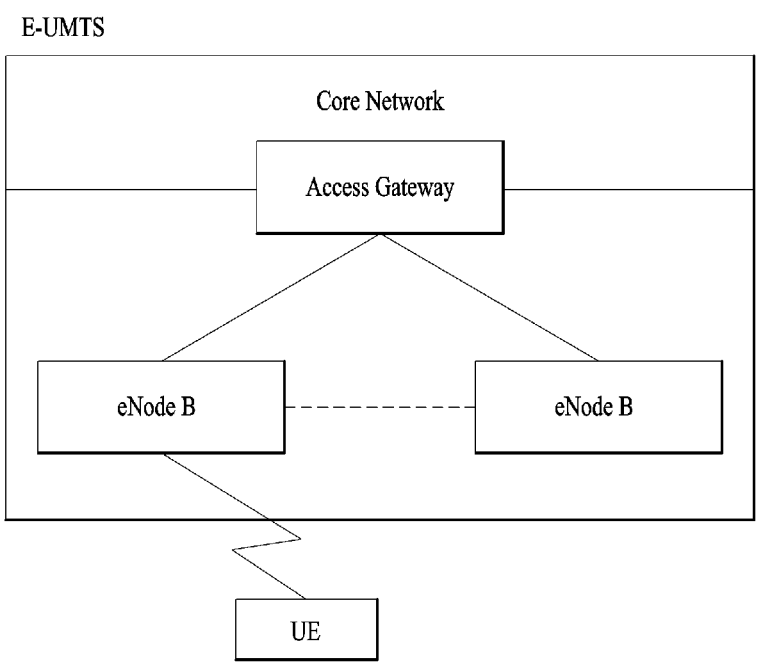
FIG. 1 illustrates a network structure of an E-UMTS as an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). CDMA may be implemented by radio technology such as UTRA (universal terrestrial radio access) or CDMA2000. TDMA may be implemented by radio technology such as global system for mobile communications (GSM)/general packet radio service (GPRS)/enhanced data rates for GSM evolution (EDGE). OFDMA may be implemented by radio technology such as IEEE 802.11 (Wi-Fi), IEEE 802.16 (WiMAX), IEEE 802.20, and evolved UTRA (E-UTRA). UTRA is a part of a universal mobile telecommunications system (UMTS). 3rd generation partnership project long term evolution (3GPP LTE) is a part of evolved UMTS (E-UMTS) that uses E-UTRA, and adopts OFDMA in downlink and SC-FDMA in uplink. LTE-advanced (LTE-A) is an evolved version of 3GPP LTE.

For clarification of the description, although the following embodiments will be described based on 3GPP LTE/LTE-A, it is to be understood that the technical spirit of the present invention is not limited to 3GPP LTE/LTE-A. Also, specific terms hereinafter used in the embodiments of the present invention are provided to assist understanding of the present invention, and various modifications may be made to the specific terms within the range that they do not depart from the technical spirit of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage calls. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme on downlink, and is modulated in accordance with a single carrier frequency division multiple access (SC-FDMA) scheme on uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the amount of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for data transfer between the user equipment and the network. To this end, the RRC layers of the user equipment and the network exchange RRC messages with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging messages, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control messages and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
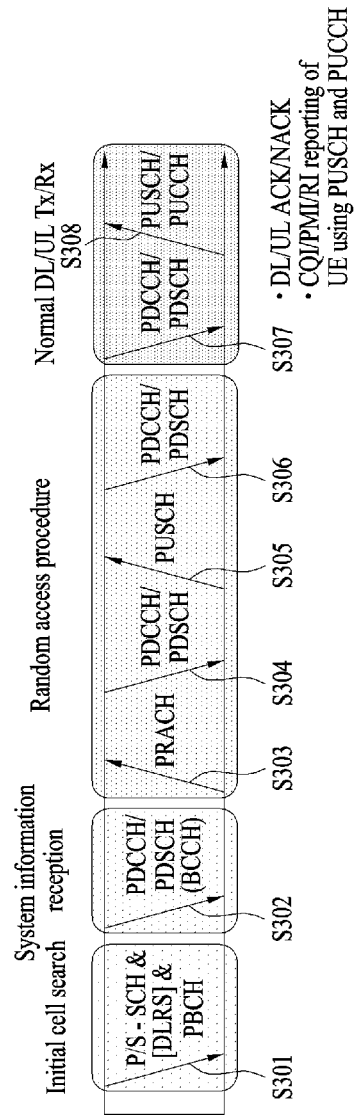
FIG. 3 illustrates physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH in step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
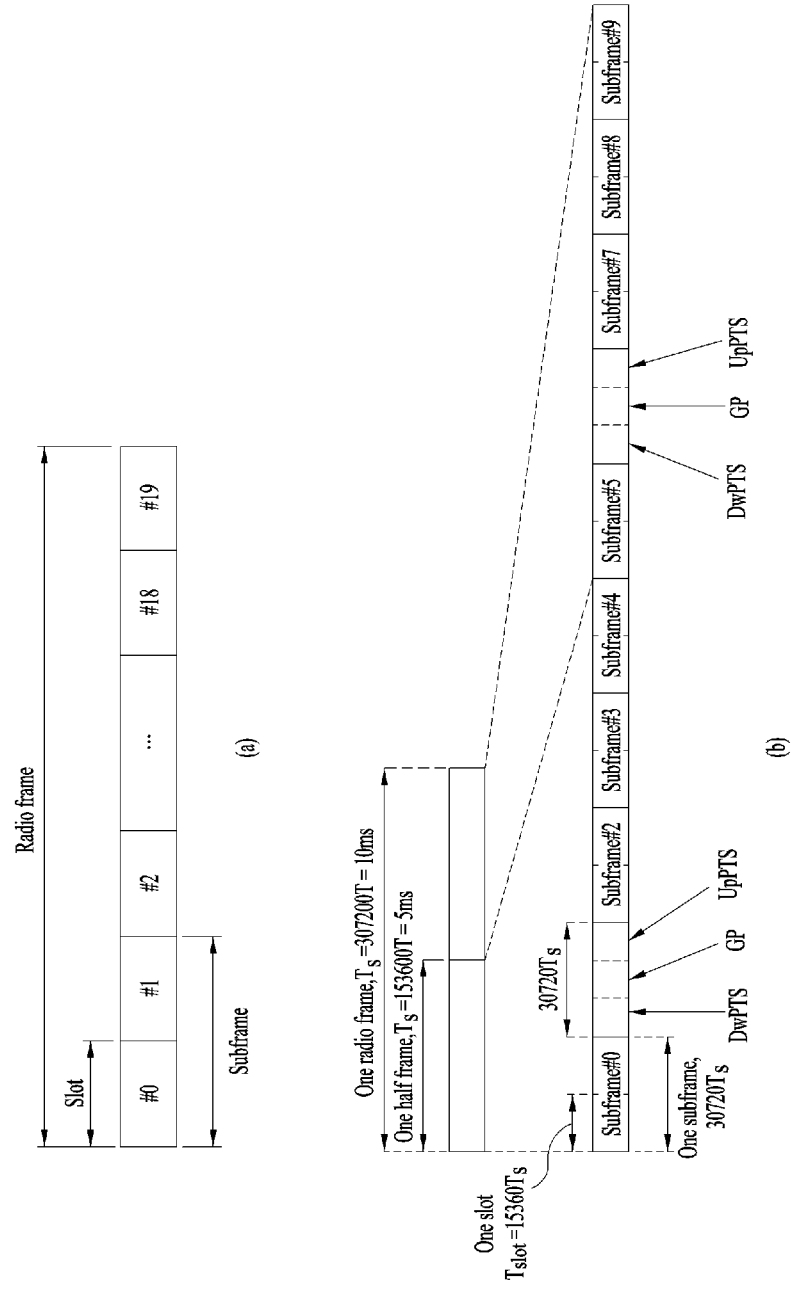
FIG. 4 illustrates a structure of a radio frame used in an LTE system.

FIG. 4 illustrates a structure of a radio frame used in LTE.

Referring to FIG. 4, in a cellular OFDM wireless packet communication system, transmission of an uplink/downlink data packet is performed on a subframe by subframe basis and one subframe is defined as a specific period including a plurality of OFDM symbols. 3GPP LTE standards support a type-1 radio frame structure applicable to FDD (Frequency Division Duplex) and a type-2 radio frame structure applicable to TDD (Time Division Duplex).

FIG. 4(a) illustrates the type-1 radio frame structure. A downlink radio frame includes 10 subframes, each of which includes two slots in the time domain. A time taken to transmit one subframe is called a TTI (transmission time interval). For example, one subframe may be 1 ms in length and one slot may be 0.5 ms in length. One slot includes a plurality of OFDM symbols in the time domain and a plurality of resource blocks (RBs) in the frequency domain. 3GPP LTE uses OFDMA on downlink and thus an OFDM symbol refers to one symbol period. An OFDM symbol may also be referred to as an SC-FDMA symbol or a symbol period. An RB as a resource allocation unit may include a plurality of consecutive subcarriers in one slot.

The number of OFDM symbols included in one slot may depend on a CP (Cyclic Prefix) configuration. The CP includes an extended CP and a normal CP. For example, when the OFDM symbol is configured according to the normal CP, the number of OFDM symbols included in one slot may be 7. When the OFDM symbol is configured according to the extended CP, the length of one OFDM symbol increases and thus the number of OFDM symbols included in one slot is less than that in the case of the normal CP. In the extended CP, for example, the number of OFDM symbols included in one slot can be 6. In the case of unstable channel state such as rapid movement of a UE at a high speed, the extended CP can be used to reduce inter-symbol interference.

When the normal CP is used, one slot includes 7 OFDM symbols and thus one subframe includes 14 OFDM symbols. Here, a maximum of three OFDM symbols located in a front portion of each subframe may be allocated to a PDCCH (Physical Downlink Control Channel) and the remaining symbols may be allocated to a PDSCH (Physical Downlink Shared Channel).

FIG. 4(b) illustrates the type-2 radio frame structure. The type-2 radio frame includes two half frames. Each half frame is composed of four normal subframes each of which includes two slots and a special subframe including two slots, a DwPTS (Downlink Pilot Time Slot), a GP (Guard Period) and a UpPTS (Uplink Pilot Time Slot).

In the special subframe, the DwPTS is used for initial cell search, synchronization or channel estimation in a UE. The UpPTS is used for channel estimation and uplink transmission synchronization of a UE in a BS. That is, the DwPTS is used for downlink transmission and the UpPTS is used for uplink transmission. Particularly, the UpPTS is used for transmission of a PRACH preamble or SRS. The GP is used to eliminate interference generated on uplink due to multipath delay of a downlink signal between uplink and downlink.

With respect to the special subframe, a configuration is currently defined in 3GPP standard document as shown in Table 1. Table 1 shows DwPTS and UpPTS when $T_s=1/(15000 \times 2048)$ and the remaining period is set to a GP.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

The type-2 radio frame structure, that is, an uplink/downlink (UL/DL) configuration in a TDD system is shown in Table 2.

TABLE 2

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D indicates a downlink subframe, U indicates an uplink subframe and S represents the special subframe. In addition, Table 2 shows downlink-to-uplink switching periodicity in a UL/DL subframe configuration in each system.

The aforementioned radio frame structure is merely an example and the number of subframes included in a radio frame, the number of slots included in a subframe and the number of symbols included in a slot may be varied.

Figure 5:
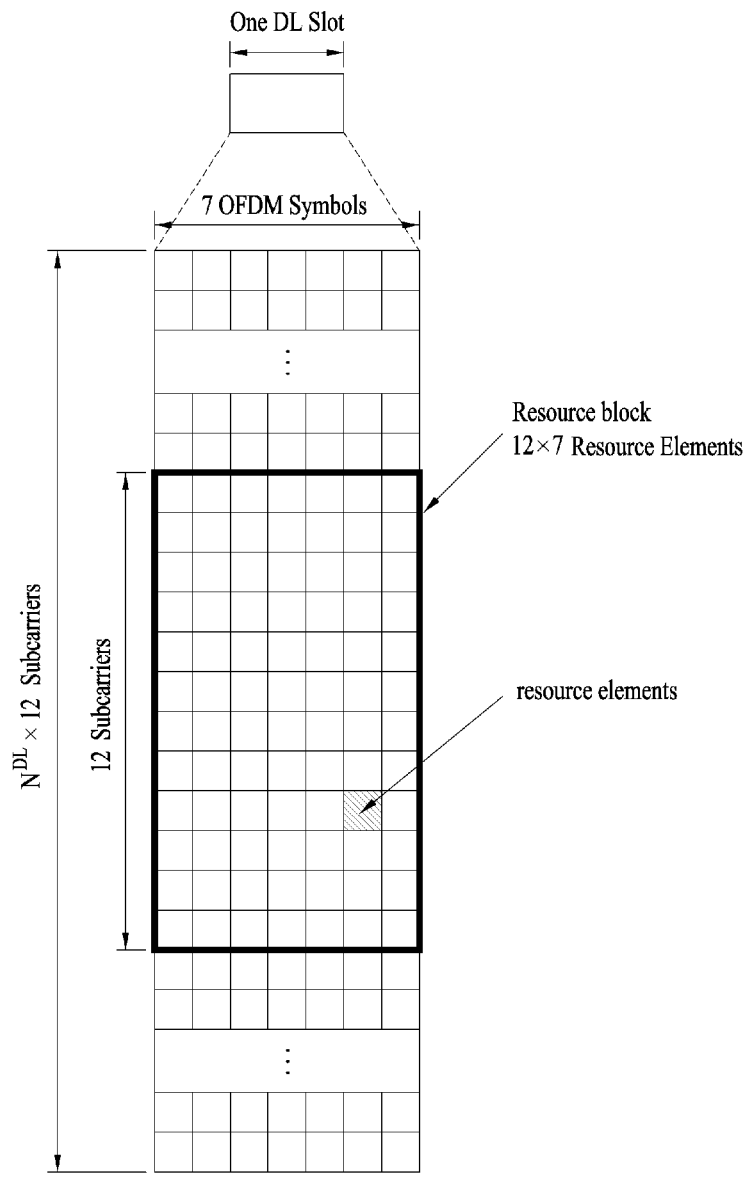
FIG. 5 illustrates a resource grid with respect to a downlink slot.

FIG. 5 illustrates a resource grid with respect to a downlink slot.

Referring to FIG. 5, the downlink slot includes $N_{symb}^{DL}$ OFDM symbols in the time domain. Since each RB includes $N_{sc}^{RB}$ subcarriers, the downlink slot includes $N_{RB}^{DL} \times N_{sc}^{RB}$ subcarriers in the frequency domain. While FIG. 5 shows that the downlink slot includes 7 OFDM symbols and the RB includes 12 subcarriers, the number of OFDM symbols and the number of subcarriers are not limited thereto. For example, the number of OFDM symbols included in the downlink slot may be varied according to CP (Cyclic Prefix) length.

Each element on the resource grid is referred to as an RE (Resource Element) and one RE is indicated by one OFDM symbol index and one subcarrier index. One RB is composed of $N_{symb}^{DL} \times N_{sc}^{RB}$ REs. The number of RBs, $N_{RB}^{DL}$, included in the downlink slot depends on a downlink transmission bandwidth set in the corresponding cell.

Figure 6:
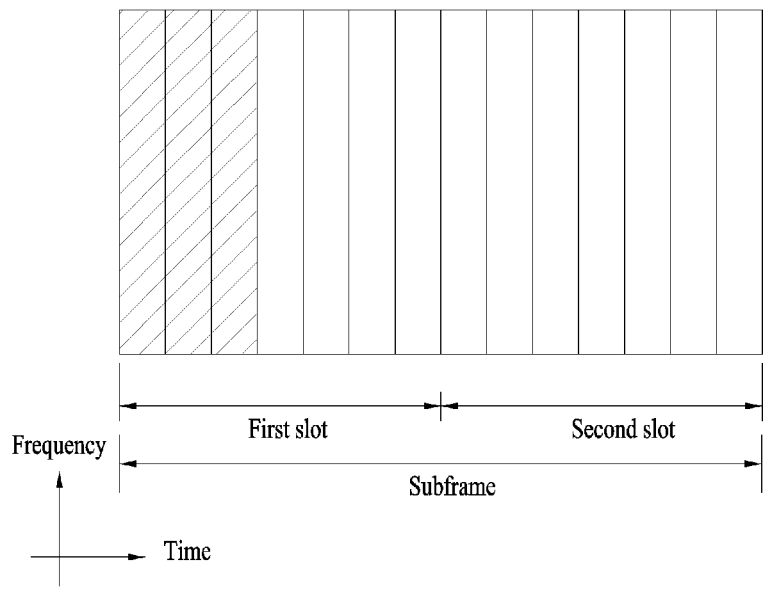
FIG. 6 illustrates a structure of a downlink subframe.

FIG. 6 illustrates a downlink subframe structure.

Referring to FIG. 6, up to three (or four) OFDM symbols at the start of the first slot in a downlink subframe are used for a control region to which control channels are allocated and the other OFDM symbols of the downlink subframe are used for a data region to which a PDSCH is allocated. Downlink control channels used in LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to uplink transmission.

Control information carried on the PDCCH is called downlink control information (DCI). The DCI includes uplink resource allocation information and other control information for a UE or a UE group. For example, the DCI includes downlink/uplink scheduling information, an uplink transmit (Tx) power control command, etc.

The PDCCH carries transmission format and resource allocation information of a downlink shared channel (DL-SCH), transmission format and resource allocation information of an uplink shared channel (UL-SCH), paging information on a paging channel (PCH), system information on the DL-SCH, resource allocation information of an upper layer control message such as a random access response transmitted on the PDSCH, a set of Tx power control commands for individual UEs in a UE group, a Tx power control command, activity indication information of voice over Internet protocol (VoIP), and the like. A plurality of PDCCHs can be transmitted in the control region. The UE is able to monitor a plurality of PDCCHs. The PDCCH is transmitted on an aggregation of one or a plurality of consecutive control channel elements (CCEs). The CCE is a logic allocation unit used to provide the PDCCH with a coding rate based on a radio channel state. The CCE corresponds to a plurality of resource element groups (REGs). The format of the PDCCH and the number of bits of the PDCCH are determined according to the number of CCEs. An eNB determines the PDCCH format according to the DCI to be transmitted to a UE and attaches cyclic redundancy check (CRC) to the control information. The CRC is masked with an identifier (e.g., radio network temporary identifier (RNTI)) depending on usage of the PDCCH or an owner of the PDCCH. For instance, if the PDCCH is for a specific UE, the CRC may be masked with an identifier (e.g., cell-RNTI (C-RNTI)) of the corresponding UE. If the PDCCH is for a paging message, the CRC may be masked with a paging identifier (e.g., paging-RNTI (P-RNTI)). If the PDCCH is for system information (more particularly, system information block (SIB)), the CRC may be masked with a system information RNTI (SI-RNTI). If the PDCCH is for a random access response, the CRC may be masked with a random access RNTI (RA-RNTI).

Figure 7:
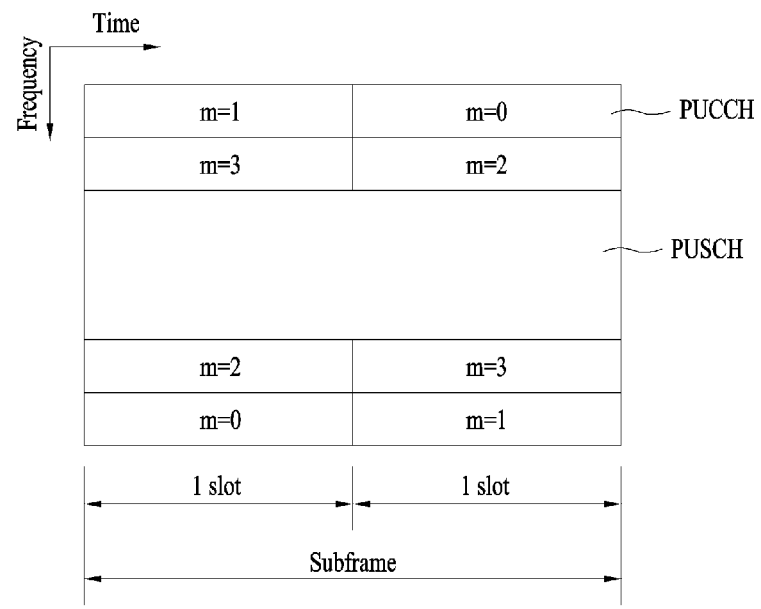
FIG. 7 illustrates a structure of an uplink subframe.

FIG. 7 illustrates a structure of an uplink subframe used in LTE.

Referring to FIG. 7, an uplink subframe includes a plurality (e.g., 2) of slots. The number of SC-FDMA symbols included in the slot may vary depending on the CP length. The uplink subframe is divided into a control region and a data region in the frequency domain. The data region includes a PUSCH and is used to transmit a data signal such as voice. The control region includes a PUCCH and is used to transmit uplink control information (UCI). The PUCCH includes an RB pair located at both ends of the data region on a frequency axis and is hopped at a slot boundary.

The PUCCH can be used to transmit the following control information.

SR (scheduling request): Information used to request UL-SCH resources. This is transmitted using an on-off keying (OOK) scheme.

HARQ ACK/NACK: Response signal with respect to a downlink data packet on PDSCH. This indicates whether the downlink data packet is successfully received. 1-bit ACK/NACK is transmitted in response to a single downlink codeword and 2-bit ACK/NACK is transmitted in response to two downlink codewords.

CSI (channel state information): Feedback information with respect to a downlink channel. The CSI includes a channel quality indicator (CQI) and MIMO-related (multiple input multiple output) feedback information includes a rank indicator (RI), a precoding matrix indicator (PMI) and a precoding type indicator (PTI). 20 bits are used in each subframe.

The amount of UCI that can be transmitted in a subframe by a UE depends on the number of SC-FDMA symbols available for control information transmission. The SC-FDMA symbols available for control information transmission mean the remaining SC-FDMA symbols except SC-FDMA symbols for reference signal transmission in a subframe. In case of a subframe having a sounding reference signal (SRS) configured therein, a last SC-FDMA symbol of the subframe is also excluded. The reference signal is used for coherent detection of the PUCCH.

A description will be given of D2D (device-to-device) communication.

D2D communication can be divided into communication assisted by a network/coordination station (e.g., BS) and communication that is not assisted. FIG. 8 is a reference diagram illustrating D2D communication.

FIG. 8(a) illustrates a scheme in which a network/coordination station intervenes in transmission and reception of a control signal (e.g., grant message), HARQ, channel state information and the like and only data is transmitted and received between UEs that perform D2D communication. FIG. 8(b) illustrates a scheme in which a network provides only minimum information (e.g., D2D connection information that can be used in the corresponding cell) and UEs performing D2D communication establish links and transmit and receive data.

A method of efficiently configuring D2D synchronization signal (D2DSS) (transmission/reception) resources and D2DSS transmission conditions in an environment in which D2D communication is performed according to the present invention will be described on the basis of the above description.

Here, D2D communication refers to direct communication between UEs using a radio channel. A UE generally refers to a user terminal and may be regarded as a UE to which the present invention is applicable when network equipment such as an eNB transmits/receives signals according to communication scheme between UEs. Further, WAN DL communication may refer to communication through which an eNB transmits an (E)PDCCH, a PDSCH, a CRS, a CSI-RS and the like to a UE and WAN communication may refer to communication through which a UE transmits a PRACH, a PUSCH, a PUCCH and the like to an eNB.

While the present invention will be described on the basis of 3GPP LTE for convenience of description, the present invention is applicable to systems other than 3GPP LTE.

Furthermore, a UE that transmits D2D signals is defined as "D2D TX UE" and a UE that receives D2D signals is defined as "D2D RX UE" for convenience of description.

In addition, embodiments of the present invention may be extended and applied to i) a case in which some D2D UEs joining in D2D communication are within network coverage and the remaining D2D UEs are outside network coverage (D2D discovery/communication of partial network coverage), ii) a case in which all D2D UEs joining in D2D communication are within network coverage (D2D discovery/communication within network coverage) and/or iii) a case in which all D2D UEs joining D2D communication are outside network coverage (D2D discovery/communication outside network coverage (for public safety only)).

A description will be given of resource configuration/allocation when D2D communication is performed prior to detailed description of the present invention.

When a UE directly communicates with another UE using a radio channel, in general, a resource unit (RU) corresponding to a specific resource is selected within a resource pool that refers to a set of contiguous resources and a D2D signal is transmitted using the RU (i.e., operation of a D2D TX UE). Information on a resource pool in which the D2D TX UE can transmit a signal is signaled to a D2D RX UE and the D2D RX UE detects a signal of the D2D TX UE. Here, the resource pool information may be i) signaled by an eNB when the D2D TX UE is within the coverage of the eNB and ii) signaled by another UE or determined as predetermined resources when the D2D TX UE is outside the coverage of the eNB.

In general, a resource pool is composed of a plurality of RUs and each UE may select one or more RUs and use them to transmit D2D signals thereof.

Figure 9:
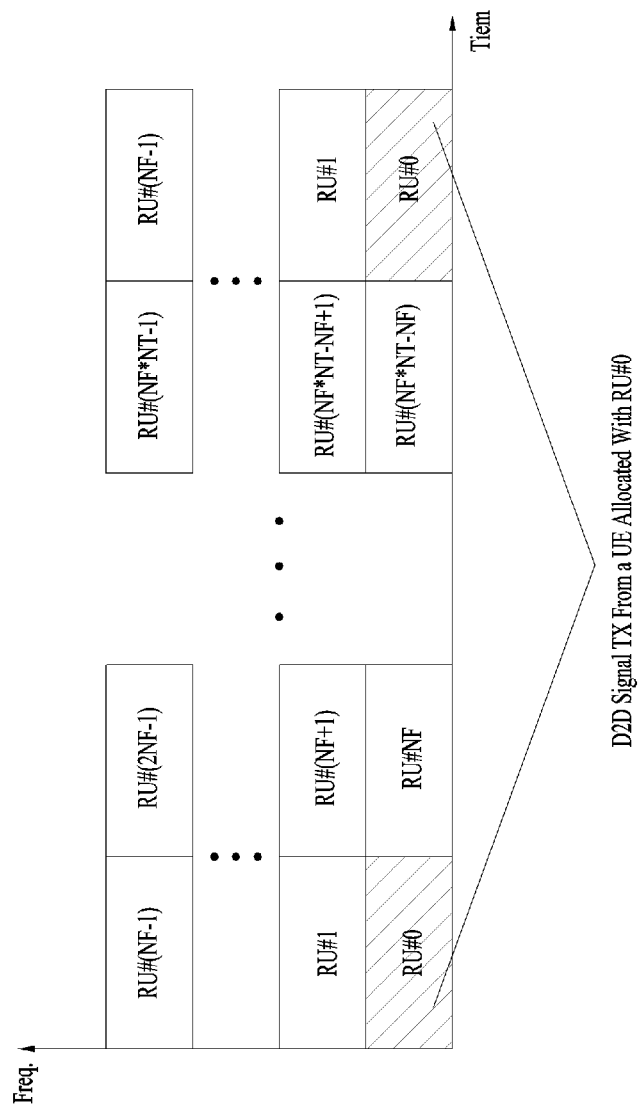
FIG. 9 is a reference diagram illustrating an example of a configuration of resource units (RUs) for D2D communication.

FIG. 9 is a reference diagram illustrating an example of a configuration of RUs for D2D communication. The diagram shows that all frequency resources are divided into NF resources and all time resources are divided into NT resources to define a total of NF*NT RUs. Here, it can be considered that the corresponding resource pool is repeated at an interval of NT subframes. Characteristically, one RU may periodically appear as illustrated in FIG. 9. Further, the index of a physical RU to which a logical RU is mapped may be varied with time in a predetermined pattern in order to obtain diversity effect in the time or frequency domain. In such an RU configuration, a resource pool may refer to a set of RUs that can be used for a UE to transmit D2D signals.

Furthermore, the aforementioned resource pool may be subdivided. First of all, the resource pool can be classified according to D2D signal content transmitted in the resource pool. For example, D2D signal content can be classified as follows and a resource pool may be configured per D2D signal content.

Scheduling assignment (SA): refers to a signal including information such as positions of resources used for each D2D TX UE to transmit a trailing D2D data channel and an MCS (Modulation and Coding Scheme) or MIMO transmission scheme necessary to demodulate other data channels. This signal can be multiplexed with D2D data and transmitted in the same RU. In this case, an SA resource pool may refer to a resource pool in which the SA is multiplexed with D2D data and transmitted. This is referred to as an "SA pool" in the present invention for convenience of description.

D2D data channel: refers to a resource pool used for a D2D TX UE to transmit user data using resources designated through the SA. When the D2D data channel can be multiplexed with SA information and transmitted in the same RU, only the D2D data channel exclusive of the SA information is transmitted in the resource pool for the D2D data channel. In other words, resource elements (REs) used to transmit SA information in an individual RU in the SA resource pool are used to transmit D2D data in the resource pool of the D2D data channel. Hereinafter, this is referred to as a "data pool" in the present invention for convenience of description.

Discovery message: refers to a resource pool for a message through which a D2D TX UE transmits the ID thereof such that a neighbor UE can discover the D2D TX UE. This is referred to as a "discovery pool" in the present invention for convenience of description.

For the same D2D signal content, different resource pools may be used depending on D2D signal transmission/reception properties. For example, even the same D2D data channel or discovery message may be divided into different resource pools according to i) a D2D signal transmission timing determination method (e.g., a method of transmitting a D2D signal at synchronization reference signal reception timing or a method of applying a specific TA (Timing Advance) and transmitting a D2D signal at synchronization reference signal reception timing, ii) a resource allocation method (e.g., a method through which a cell designates transmission resources for an individual signal to an individual D2D TX UE or a method through which an individual D2D TX UE selects individual signal transmission resources within a pool or iii) a signal format (e.g., the number of symbols occupied by each D2D signal in one subframe or the number of subframes used to transmit one D2D signal).

Furthermore, a resource allocation method for D2D data channel transmission may be divided into the following two modes.

Mode 1: refers to a method through which a cell directly designates resources to be used for transmission of SA and D2D data to an individual D2D TX UE. Consequently, the cell can correctly recognize a UE which will transmit a D2D signal and resources which will be used by the UE to transmit the D2D signal. However, since designation of D2D resources for every D2D signal transmission may cause excessive signaling overhead, operation may be performed to allocate a plurality of SAs and/or data transmission resources through one-time signaling.

Mode 2: refers to a method through which an individual D2D TX UE selects appropriate resources within contiguous SA and data related resource pools configured by a cell for multiple D2D TX UEs and transmits SA and data. As a result, the cell cannot correctly recognize a UE which will perform D2D transmission and resources which will be used for D2D transmission.

Furthermore, a resource allocation method for discovery message transmission may be divided into the following two types.

Type 1: a discovery procedure when resources for non-UE-specific basis discovery signal transmission are allocated. Here, the resources may be for all UEs or a group of UEs.

Type 2: a discovery procedure when resources for UE-specific basis discovery signal transmission is allocated.

Type 2A: a resource is allocated per specific transmission instance of each discovery signal.

Type 2B: a resource is semi-persistently allocated for discovery signal transmission.

Figure 10:
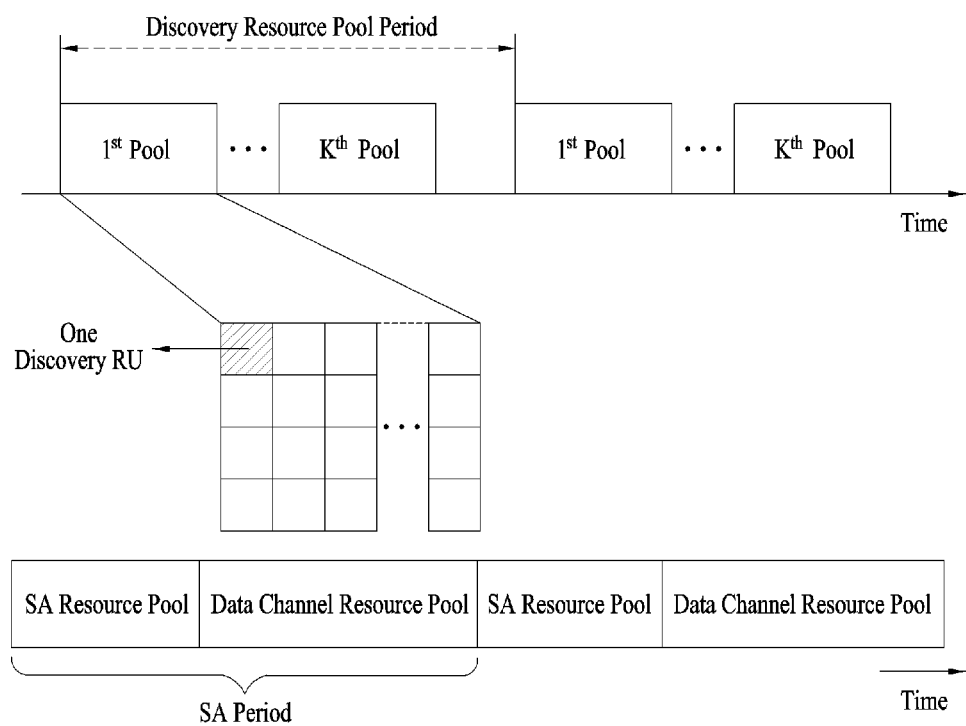
FIG. 10 illustrates a case in which a discovery message related resource pool periodically appears.

FIG. 10 illustrates a case in which a discovery message related resource pool (referred to hereinafter as "discovery resource pool") periodically appears. In FIG. 10, a period in which the resource pool appears is referred to as a "discovery resource pool period". Further, specific discovery resource pools from among a plurality of discovery resource pools configured in (one) discovery resource pool period may be defined as serving cell related discovery transmission/reception resource pools and other (remaining) discovery resource pools may be defined as neighbor cell related discovery reception resource pools.

A D2DSS resource configuration method and D2DSS transmission conditions proposed by the present invention will be described on the basis of the above description.

First of all, a case of in-coverage (or in-network (in-NW)) UEs will be described.

- A maximum of one D2DSS resource may be configured per cell for in-coverage UEs. Here, the D2DSS resource includes a periodically appearing subframe that satisfies the following conditions i) and ii). A D2DSS may be transmitted in the periodically appearing subframe. (For example, an eNB uses resources that are not used for D2DSS transmission (for WAN communication)). i) The period of the D2DSS resource is identical in in-coverage and out-of-coverage cases and may be previously fixed to 40 ms. ii) a timing offset in units of subframe may be set when the D2DSS resource is configured and a D2DSS resource offset (e.g., a subframe based timing offset of a serving cell for SFN #0) of neighbor cells may be signaled through SIB.
- A UE, which transmits SA or D2D data, transmits the D2DSS in each subframe that satisfies (part of or all) the following conditions in the D2DSS resource.
- A subframe that does not collide with cellular transmission from the viewpoint of the UE
- A subframe that satisfies predefined conditions such as UE capability
- A subframe within the SA or D2D data period in which SA or data is transmitted
- A subframe that satisfies other predefined conditions when the UE is in an RRC_connected state and the eNB instructs D2DSS transmission to be initiated (through dedicated signaling) and/or the UE does not transmit the SA or D2D data in a subframe within the SA or D2D data period and/or satisfies (part or all of) the following conditions
- An RSRP threshold value for D2D communication related D2DSS transmission is set through SIB. Here, the threshold value may be set to one of {−∞, −115 ... −60 (increasing by 5), +∞} dBm, for example.
- The RSRP value of the UE is lower than the threshold value.
- The eNB does not instruct D2DSS transmission to be stopped (through dedicated signaling).
- For each discovery pool, a discovery UE transmits a D2DSS in the corresponding subframe of each discovery pool if (part or all of) the following conditions are satisfied when the first subframe is the D2DSS resource. When the first subframe is not the D2DSS resource, the discovery UE transmits the D2DSS in the corresponding subframe if (part or all of) the following conditions are satisfied in the closest D2DSS resource present prior to the discovery pool start time.
- A subframe that does not collide with cellular transmission from the viewpoint of the UE
- The UE does not perform scanning for other D2DSSs.
- A subframe that satisfies predefined conditions such as UE capability
- The UE transmits a discovery message within the discovery pool.
- The UE is in an RRC_connected state and the eNB instructs D2DSS transmission to be initiated (through dedicated signaling) and/or all (or part of) the following conditions are satisfied.
- An RSRP threshold value for D2D discovery related D2DSS transmission is set through SIB. Here, the threshold value may be set to one of {−∞, −115 ... −60 (increasing by 5), +∞} dBm, for example.
- The RSRP value of the UE is lower than the threshold value.
- The eNB does not instruct D2DSS transmission to be stopped (through dedicated signaling).

An out-of-coverage (or out-network (out-NW) UE will be described. The out-of-coverage UE cannot transmit a D2DSS in two or more D2DSS resources. Here, two D2DSS resources are used for out-of-coverage, for example. D2DSS resource positions may be previously set or signaled (with respect to DFN #0 (or on the basis of DFN #0)), for example.

For example, when a D2D RX UE receives neighbor cell related synchronization error information of w1/w2 (through predefined higher layer signaling), the D2D RX UE assumes a discovery reference synchronization window having a size of ±w1/±w2 for a neighbor cell D2D resource (and/or a neighbor cell discovery resource pool) (refer to Table 3).

TABLE 3

Figure 11:
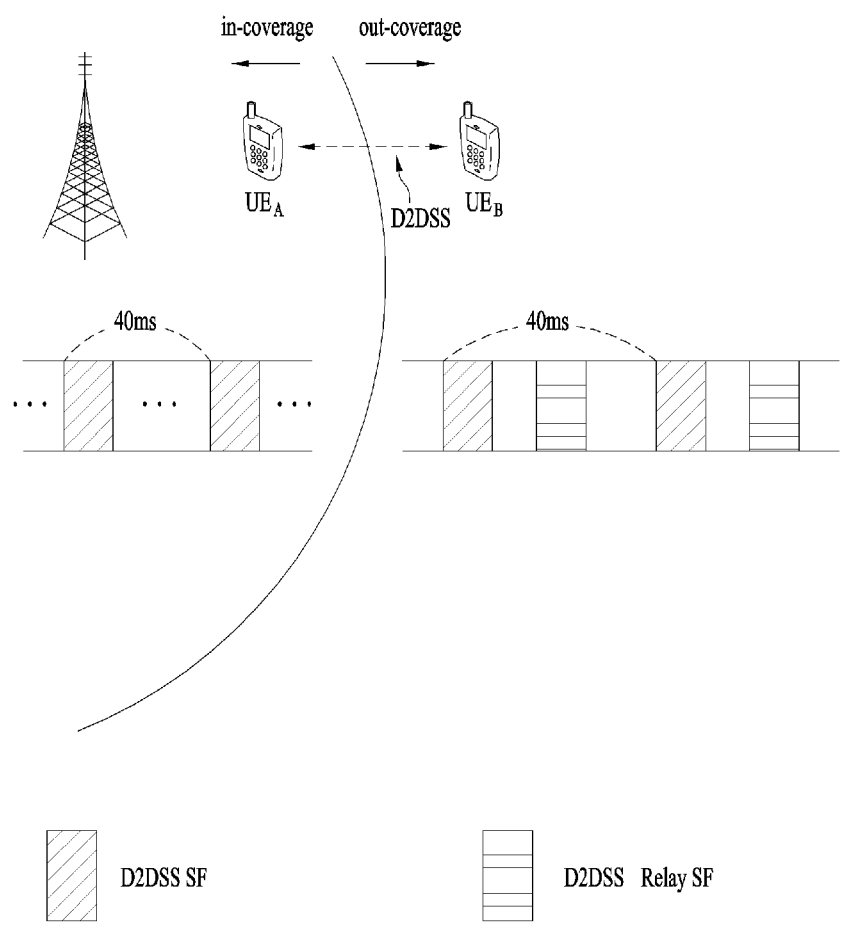
FIG. 11 is a reference diagram illustrating a D2DSS SF configuration and a D2DSS relay SF with respect to an in-coverage UE and an out-of-coverage UE.

If higher layer indicates w1 in a given neighbor cell, UE may assume for the purpose of discovery a reference synchronization window of size +/−w1 ms for that neighbour cell with respect to neighbour cell D2DSS resource
    w1 is a fixed value and decided
    UE may assume D2DSS is transmitted in that cell
If higher layer indicates w2 in a given neighbor cell, UE may assume for the purpose of discovery a reference synchronization window of size +/−w2 ms for that neighbour cell with respect to neighbour cell discovery resource
    Exact value of w2 is decided
    RAN1 recommend w2 as not greater than CP length (of the order of CP length)
UE expects that D2DSS indicated by the resource pool configuration appears only within signaled reference synchronization window FIG. 11 is a reference diagram illustrating D2DSS SF configuration and D2DSS relay SF for the aforementioned in-coverage UE and out-of-coverage UE.

Referring to FIG. 11, a maximum of one D2DSS resource (e.g., D2DSS SF) may be configured per cell for an in-coverage UE (e.g., $UE_A$) present within the coverage of an eNB. For an out-of-coverage UE present outside the coverage of the eNB, (another) D2DSS resource (e.g., D2DSS relay SF) for D2DSS relay may be configured along with (one) D2DSS resource aligned with the D2DSS resource for the in-coverage UE.

Figure 12:
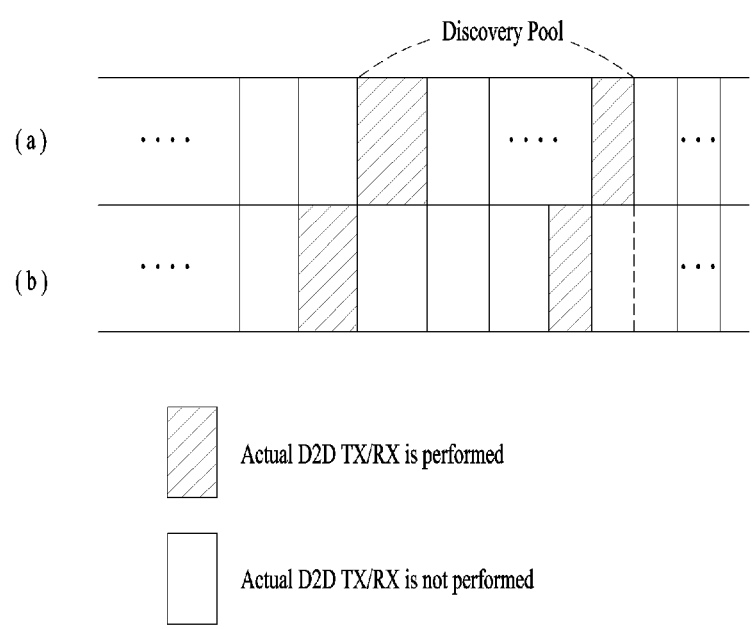
FIG. 12 illustrates positions of resource pools carrying a D2DSS.

FIG. 12 illustrates positions of discovery pools in which a D2DSS is transmitted. Referring to FIG. 12, the D2DSS can be transmitted in the first subframe of a discovery pool (a) or a subframe corresponding to the closest D2DSS resource prior to discovery pool start time (b).

D2DSS transmission conditions may be different for the in-coverage UE and the out-of-coverage UE. For example, i) D2DSS transmission can be instructed by the eNB through dedicated signaling or ii) D2DSS transmission can be determined according to (previously set or designated) RSRP standards in the case of the in-coverage UE. In the case of the out-of-coverage UE, for example, D2DSS transmission can be determined on the basis of (energy) measurement/detection with respect to a PSBCH (Physical Sidelink Broadcast Channel) DMRS. Here, is a signal (e.g., a PSBCH DMRS) equal to or greater than a predetermined threshold value is not measured/detected (within a predetermined area/distance), for example, the UE performs D2DSS transmission (as an independent synchronization source (ISS)) upon determining that there is no synchronization source (within the predetermined area/distance). Although only discovery (pool) related D2DSS transmission has been described with reference to FIG. 12 for convenience of description, the present invention can be extended and applied to D2D communication (e.g., SA and D2D data) (pool) related D2DSS transmission.

Based on the above description, operation of an in-NW UE will be described first. D2DSS transmission can be an optional characteristic of D2D capable UEs. Accordingly, it is desirable that only D2DSS capable UEs transmit a D2DSS, for example.

A discovery UE transmits a D2DSS in a single subframe in each discovery period. This operation can be performed according to discovery only for in-NW UEs. That is, an in-NW UE is synchronized with a cell and thus frequency error between a TX UE and an RX UE is limited and D2DSS detection in a single subframe is sufficiently reliable. In this case, additional conditions for D2DSS scanning are not necessary because the serving cell provides D2DSS resources of neighbor cells and D2DSS resources of a plurality of cells can be separated in the time domain according to network configuration. Furthermore, a UE may not transmit a discovery signal in a resource pool because of collision with WAN UL TX.

Accordingly, it is necessary to change one of the aforementioned discovery related D2DSS transmission conditions, "the UE transmits a discovery message in the discovery pool", to "the UE intends to transmit a discovery message in the discovery pool".

In addition, whether a D2DSS needs to be transmitted prior to SA transmission may be considered with respect to communication. (Here, data cannot be transmitted prior to SA transmission.) This is because D2DSS resources may not be present before an SA subframe within the SA/data period. In this case, SA can be transmitted first and then the D2DSS can be transmitted. That is, conditions similar to the aforementioned discovery (related D2DSS transmission) conditions may be additionally set if synchronization is needed prior to SA reception.

In this case, however, D2DSS transmission in a single subframe may not provide reliable synchronization capability to out-NW UEs that may have a large initialization frequency offset. Accordingly, it is desirable that the D2DSS be transmitted in a plurality of subframes prior to SA transmission. Here, time limitation may be needed for preceding D2DSS transmission because it is difficult for a UE to correctly predict intention of SA transmission when there is a large time gap between a D2DSS subframe and an SA subframe.

Further, whether to transmit the D2DSS when SA or data is not transmitted in the SA/data period will be described. Since the D2DSS for communication needs to be received by out-NW UEs, operation for discovery needs to be different from operation for communication. Specifically, out-NW UEs may have large frequency error and thus D2DSS detection capability reliability needs to be high.

For rapid synchronization of out-NW UEs, in-NW UEs need to continuously transmit the D2DSS for at least a predetermined interval. Accordingly, the out-NW UEs can detect the D2DSS at least once in a set of continuous D2DSS transmission subframes.

Furthermore, it is necessary for out-NW UEs to select synchronization reference, to perform D2DSS measurement for determination of whether D2DSS transmission conditions are satisfied and to average D2DSS subframes through appropriate (or reliable) measurement, and thus it is desirable to avoid random on-off of D2DSS transmission at intervals of 40 ms.

To this end, accordingly, a UE may be configured to transmit the D2DSS even when the UE does not transmit SA or D2D data in the SA/data period if a predetermined specific condition is satisfied. This is called "condition for continuing D2DSS transmission" hereinafter.

The "condition for continuing D2DSS transmission" can be based on the principle that a UE continuously (or consecutively) performs D2DSS transmission for a (previously set) time period if the UE has transmitted the D2DSS. This principle can guarantee continuous D2DSS transmission that helps D2DSS detection and measurement of out-NW UEs.

Accordingly, the present invention can consider the following options 1-1 to 1-3. FIG. 13 is a reference diagram illustrating options 1-1 to 1-3. A description will be given with reference to FIG. 13.

Option 1-1: "D2DSS transmission timer" can be defined. If a UE transmits the D2DSS in subframe #n under the condition that "the subframe is within the SA or D2D data period in which SA or data is transmitted", the UE can continuously (or consecutively) transmit the D2DSS in subframes #n+40, #n+80, . . . #n+K*40 even when there is no SA/data to be transmitted. Here, K corresponds to the "D2DSS transmission timer".

Option 1-2: The entire DFN range can be divided into a plurality of time partitions. When the DFN range is assumed to be 0 to 1,023 (i.e., one D2D frame corresponds to 10 ms), a DFN partition x includes D2D frames x, x+1, . . . , x+M−1 (i.e., when the DFN range is divided into 1024/M DFN partitions). If a UE transmits the D2DSS in a subframe included in DFN partition x, the UE continuously (or consecutively) transmits the D2DSS in the remaining D2DSS subframes in the DFN partition x. This option has the advantage that an RX UE can be aware of a potential D2DSS transmission related time instance after decoding DFN in an associated (or related) PD2DSCH.

Option 1-3: "D2DSS measurement period" can be defined, and a UE, which has transmitted the D2DSS in a specific subframe, transmits the D2DSS in a D2DSS measurement period related to the specific subframe. For example, a D2DSS measurement period closest to the specific subframe in which the UE transmits the D2DSS can be defined as associated with the specific subframe.

With respect to the aforementioned condition, the UE needs to clarify transmission of no D2DSS in subframes that do not satisfy D2DSS transmission conditions. The eNB may recognize at least a subset of subframes in which the D2DSS is not transmitted and use D2DSS resources in such subframes for cellular (communication) transmission.

That is, in the case of in-coverage UEs,
a UE, which transmits SA or D2D data, transmits the D2DSS in each subframe that satisfies (part or all of) the following conditions within a D2DSS resource.
A subframe that does not collide with cellular transmission from the viewpoint of the UE
D2DSS capable UE
A subframe within the SA or D2D data period in which SA or data is transmitted, a subframe within X ms from a subframe in which the UE intends to transmit SA and/or a subframe satisfying "condition for continuing D2DSS transmission"
The UE is in an RRC_connected state and the eNB instructs D2DSS transmission to be initiated (through dedicated signaling) and/or all (or part) of the following conditions are satisfied.
An RSRP threshold value for D2D communication related D2DSS transmission is set through SIB. Here, the threshold value may be set to one of {−∞, −115 . . . −60 (increasing by 5), +∞} dBm, for example.

The RSRP value of the UE is lower than the threshold value.

The eNB does not instruct D2DSS transmission to be stopped (through dedicated signaling).

For each discovery pool, a discovery UE transmits a D2DSS in the corresponding subframe of each discovery pool if (part or all of) the following conditions are satisfied when the first subframe is the D2DSS resource. When the first subframe is not the D2DSS resource, the discovery UE transmits the D2DSS in the corresponding subframe if (part or all of) the following conditions are satisfied in the closest D2DSS resource present prior to discovery pool start time.

A subframe that does not collide with cellular transmission from the viewpoint of the UE D2DSS capable UE The UE intends to transmit a discovery message in a discovery pool.

The UE is in an RRC_connected state and the eNB instructs D2DSS transmission to be initiated (through dedicated signaling) and/or all (or part) of the following conditions are satisfied.

An RSRP threshold value for D2D communication related D2DSS transmission is set through SIB. Here, the threshold value may be set to one of {−∞, −115 . . . −60 (increasing by 5), +∞} dBm, for example.

The RSRP value of the UE is lower than the threshold value.

The eNB does not instruct D2DSS transmission to be stopped (through dedicated signaling).

When the above conditions are not satisfied, the UE does not transmit the D2DSS.

In addition, for the "condition for continuing D2DSS transmission," the following three options, that is, options 2-1 to 2-3, may be considered.

Option 2-1: A D2DSS timer is defined and a UE, which has transmitted the D2DSS under the SA/data transmission conditions, may maintain D2DSS transmission without transmitting SA/data until the timer expires.

Option 2-2: The DFN range is divided into a plurality of DFN partitions and a UE, which has transmitted the D2DSS in a subframe, transmits the D2DSS in a DFN partition.

Option 2-3: A D2DSS measurement period is defined and a UE, which has transmitted the D2DSS in a subframe, transmits the D2DSS in an associated D2DSS measurement period.

Furthermore, a reference synchronization window for discovery may be applied to communication for D2DSS reception because discovery and communication share the same D2DSS resource. The UE can detect a correct position of D2DSS transmission for discovery after reception of a discovery resource pool. Further, since the D2DSS may be omitted or transmitted outside the synchronization window in the case of w2, D2DSS (reception) related UE supposition within the synchronization window may be limited to the case of w1.

Accordingly, the reference synchronization window can be applied to both discovery and communication on the basis of the principle that "a UE expects that D2DSS indicated by the resource pool configuration appears only within a signaled reference synchronization window if w1 is indicated."

Next, out-NW UEs will be described. For example, it is important to minimize the number of D2DSSs that need to be tracked by an out-NW UE. That is, the UE can track only a limited number of D2DSSs and thus cannot receive all incoming SA and data when the number of D2DSSs related to incoming SA and data exceeds the limited number.

Accordingly, UE capability of tracking different timings is limited and thus the following UE operations need to be considered. That is, 1) A UE synchronized with the D2DSS transmits the same D2DSS in order to generate a synchronization cluster sharing common timing.

2) Only a data TX UE can be an ISS (Independent Synchronization Source).

3) If a specific sequence has been transmitted in a previous period, the ISS excludes the same D2DSS sequence during D2DSS reselection.

Accordingly, a D2DSS sequence selection process for out-NW UEs is determined by the following three steps. Hereinafter, a "set of D2DSS sequence(s) transmitted by a UE when the transmission timing reference is an eNB" is referred to as D2DSS_net and a "set of D2DSS sequence(s) transmitted by a UE when the transmission timing reference is not an eNB" is referred to as D2DSSue_oon, for example, for convenience of description.

Step 1: If an out-NW UE selects D2DSS X of D2DSSue_net as a TX timing reference thereof, the UE selects D2DSS Y in D2DSSue_oon and transmits the selected D2DSS Y during D2DSS transmission. Such selection may be randomly performed or the UE may avoid/prevent selection of a D2DSS detected during the TX timing reference selection process.

Step 2: If the UE selects D2DSS Z of D2DSSue_oon as a TX timing reference thereof, the UE transmits the same D2DSS Z during D2DSS transmission.

Step 3: If the UE has D2D data traffic to transmit, the UE can be an ISS (Independent Synchronization Source) using a D2DSS randomly selected from D2DSSue_oon.

Step 2 enables D2DSS relay operation of reducing the number of D2DSSs in a system in consideration of the fact that the UE synchronized with a D2DSS transmits the same D2DSS in order to generate a synchronization cluster sharing common timing.

Furthermore, if a specific sequence has been transmitted in a previous period, it is assumed that D2DSS Z is not detected in order to allow an ISS that has performed (or started) D2DSS Z transmission to be synchronized with another D2DSS in consideration of the fact that an ISS excludes the same D2DSS sequence during D2DSS reselection. In other words, the ISS can maintain ISS operation only when a D2DSS other than the D2DSS transmitted by the ISS is not detected during the reselection process before the reselection process is performed. After this process, the out-NW UE can determine a D2DSS sequence to be used for D2DSS transmission.

In addition, the present invention specifically defines "detecting D2DSS" because it is not appropriate that a D2DSS is considered to be detected and a UE is used as a reliable synchronization source when an associated PD2DSCH is not correctly decoded or PD2DSCH reception quality is considerably low. Specifically, when associated PD2DSCH reception quality (e.g., RSRQ of a PD2DSCH DMRS) is lower than a specific level, a UE can assume that the D2DSS is not detected (and thus the D2DSS does not affect the D2D synchronization process of the UE).

Therefore, according to the present invention, the following settings can be applied for D2DSS sequence selection.

If a UE selects D2DSSue_oon as a TX timing reference thereof, the UE transmits the same D2DSS.

The UE assumes that UEs transmitting the same D2DSS have been synchronized.

Conditions under which an out-NW UE transmits a D2DSS using a D2DSS sequence selected through the aforementioned process will be additionally described. Basically, D2DSS transmission condition formulations for in-NW UEs can be reused. A UE that is not an ISS transmits a D2DSS irrespective of whether SA/data thereof is transmitted when D2DSSs from other UEs are detected. That is, additional conditions for D2DSS transmission of a non-ISS UE may be needed. For example, an RSRP threshold value can be replaced by a D2DSS measurement threshold value and eNB configuration parts may be removed.

For reliable D2DSS detection and measurement of out-NW UEs, D2DSS transmission may need to be performed prior to SA transmission and D2DSS transmission maintaining conditions may be necessary.

Therefore, according to the present invention, conditions for determining whether a D2DSS will be transmitted in one subframe by an out-NW UE can be set as follows.

In the case of out-of-coverage UE
When a UE is an independent synchronization source (ISS), the UE needs to transmit a D2DSS in a subframe in a D2DSS resource selected by the UE for D2DSS transmission if the subframe is i) a subframe within a SA or D2D data period in which SA or D2D data is transmitted, ii) a subframe within X ms from a subframe in which the UE intends to transmit SA and/or iii) a subframe satisfying "condition for continuing D2DSS transmission".

When the UE is not an independent synchronization source, the UE needs to transmit a D2DSS in a subframe in a D2DSS resource that is not used to receive TX synchronization reference thereof i) when the subframe is a subframe in a SA or D2D data period in which SA or D2D data is transmitted, a subframe within X ms from a subframe in which the UE intends to transmit SA and/or a subframe satisfying the "condition for continuing D2DSS transmission" and/or when the D2DSS of the TX synchronization reference thereof is detected in a (preset) time window and/or ii) when a D2DSS measurement value of the TX timing reference is lower than a threshold value.

Furthermore, only two D2DSS resources are configured as D2D TX resources, and out-NW UEs receive a D2DSS from their synchronization references in one D2DSS resource and transmit a D2DSS in the remaining D2DSS resource.

In the case of out-of-coverage UEs, a periodically appearing synchronization resource is used for D2DSS transmission. Here, a PD2DSCH (if supported) may be transmitted during D2DSS transmission, for example. In addition, the size of the synchronization resource may be predefined and the period of the synchronization resource may be preset.

When a D2D synchronization source transmits a D2DSS in synchronization resources, the D2D synchronization source transmits the D2DSS in at least one synchronization resource and receives the D2DSS in at least other synchronization resources. Here, synchronization resources used to transmit and/or receive the D2DSS may be preset. In addition, a timing offset may be set between a synchronization resource for D2DSS reception and a synchronization resource for D2DSS transmission.

Therefore, according to the present invention, a UE must not transmit any (other) D2D signals/channels in a (D2DSS) subframe that is not used for D2DSS transmission thereof in order to clarify D2DSS reception from other UEs.

Next, whether a D2D-silent period is necessary when a UE performs the D2DSS reselection process will be described. Even when a synchronization resource periodically appears and the UE does not transmit any (other) D2D signals/channels in (other) synchronization resources other than synchronization resources used for D2DSs transmission thereof, D2DSS transmission from eNBs and UEs which are not synchronized with the periodic synchronization resource may be performed (in synchronization resources that are not used for D2DSS transmission of the UE). Accordingly, to allow UEs to efficiently scan potential asynchronous D2DSSs, it is necessary to define a "D2D-silent period" for D2D scanning that is not obstructed (or interfered with) by transmission of neighbor D2D UEs. If this period is not defined, an out-NW UE may not detect a D2DSS that is transmitted from an eNB or an in-NW UE and is weak but has high priority due to interference from other out-NW UEs.

Accordingly, the present invention can define the "D2D-silent period" as a multiple of a D2DSS period to support scanning of other synchronization sources by out-NW UEs.

A description will be given of WAN DL signal reception operation assumed by a D2D RX UE (i.e., "SRXCH_D2D RX UE") with a single RX chain in case of D2D discovery signal reception on the basis of the above description.

TABLE 4

For FDD carriers:
    At least for UEs with a single Rx chain (FFS subject to the UE capability discussion whether this also applies for UEs with a shared D2D/cellular Rx chain), a UE that is receiving D2D discovery signals on an UL carrier is not expected to read DL signals on the DL carrier paired to such UL carrier during the subframes belonging to the D2D discovery pools on that UL carrier as well as one subframe preceding and following these subframes
        The discovery pools are configured by the eNB by broadcast or UE-specific signaling
            FFS: For RRC_CONNECTED UEs, 1 bit may be signalled using RRC signaling indicating whether this rule applies or not (on a per UE basis)
    Cellular measurement gaps subframes are excluded from this rule
    Paging reception is prioritized over D2D reception
For TDD carriers:
    A UE configured by the eNB to monitor D2D on a certain carrier is expected to read DL signals on that carrier according to legacy procedures.

In addition, an example of assumption/setting of synchronization for reception of an inter-cell discovery signal (or neighbor cell discovery signal) of the D2D RX UE is as shown in Table 3. For example, when the D2D RX UE receives neighbor cell related synchronization error information of w1/w2 (through predefined high layer signaling), the D2D RX UE assumes a discovery reference synchronization window having a size of ±w1/±w2 for a neighbor cell D2D resource (e.g., a neighbor cell D2DSS resource (and/or a neighbor cell discovery resource pool)) (refer to Table 3)

In a specific example, when a neighbor cell D2DSS resource is configured on serving-cell SF#N, the D2D RX UE assumes that a neighbor-cell D2DSS can be received within the range of "SF#N−w1" to "SF#N+w1". In addition, when the D2D RX UE receives neighbor cell related synchronization error information of w2 (through predefined higher layer signaling), the D2D RX UE assumes a discovery reference synchronization window having a size of ±w2 for the neighbor-cell discovery resource. In a specific example, when the neighbor-cell discovery resource is configured on serving-cell SF#K, the D2D RX UE assumes that the neighbor-cell discovery resource can be received within the range of "SF#K−w2" to "SF#K+w2".

The present invention proposes methods of efficiently receiving WAN downlink signals in DL SFs at least some (i.e., some or all) of which overlap in the time domain when a D2D RX UE with a single RX chain is preset or D2D signals in a signaled D2D signal resource pool and/or D2DSSs (associated with the D2D signal resource pool) are received in an environment in which D2D communication is performed.

For convenience of description, a D2D RX UE with a single RX chain is referred to as a "SRXCH_D2D RX UE". In the present invention, the "SRXCH_D2D RX UE" may be extended and interpreted as a UE having a smaller number of RX chains than the number of RX chains necessary to perform simultaneous reception operation related to a WAN DL signal/channel and/or a D2D signal/channel. For example, due to only one RX chain, the SRXCH_D2D RX UE has difficulty in simultaneously receiving D2D signal(s) (i.e., UL carrier #X) and WAN downlink signal(s) (i.e., DL carrier #X paired with UL carrier #X) transmitted on different carriers (or frequency bands) in time resource regions at least some (i.e., some or all) of which overlap, or D2DSS(s) and WAN downlink signal(s). For example, the SRXCH_D2D RX UE receives i) D2D signal(s)/D2DSS(s) and WAN downlink signal(s) or ii) D2DSS(s) and WAN downlink signal(s) transmitted in different time resource regions on different carriers (or frequency bands) through carrier (or frequency band) switching operation of the single RX chain.

Further, the DL SFs at least some (i.e., some or all) of which overlap in the time domain may be interpreted as at least one of i) DL SFs at least some (i.e., some or all) of which overlap with all SFs within a period to which a D2D signal resource pool configuration related bit map is applied in a time resource region, ii) DL SFs at least some (i.e., some or all) of which overlap with D2DSS(s) (valid in relation to D2D signal resource pool or D2D signal reception) in a time resource region, iii) DL SFs at least some (i.e., some or all) of which overlap with a single preceding SF and a single following SF of the D2D signal resource pool (shown in Table 4) (i.e., SF(s) for securing a time necessary for carrier (or frequency band) switching operation of the single RX chain) in a time resource region, iv) DL SFs at least some (i.e., some or all) of which overlap with SF(s) configured as D2D SF(s) from among SFs within the period to which the D2D signal resource pool configuration related bit map is applied in a time resource region, and v) DL SFs at least some (i.e., some or all) of which overlap with a single preceding SF and a single following SF of D2DSS(s) (valid in relation to D2D signal resource pool or D2D signal reception) (i.e., SF(s) for securing a time necessary for carrier (or frequency band) switching operation of the single RX chain) in a time resource region.

For convenience of description, such DL SFs are referred to as "INV_DL SFs" (or "DL GAP"). The SRXCH_D2D RX UE may not receive WAN downlink signals in the INV_DL SFs (or DL GAP) during reception of D2D signals/D2DSSs. Further, a previously set or signaled D2D signal resource pool may be interpreted as at least one of a serving-cell related D2D signal resource pool and a neighbor-cell related D2D signal resource pool. In addition, the position of at least one valid D2DSS resource related to i) D2D SA reception, ii) D2D data reception, iii) D2D discovery signal reception or iv) D2D discovery pools may be assumed according to the aforementioned D2DSS resource configuration.

The following embodiments of the present invention assumes a situation in which the SRXCH_D2D RX UE receives discovery signals and/or D2DSSs (associated with a previously set or signaled (serving-cell/neighbor-cell) D2D signal resource pool) in the previously set or signaled (serving-cell/neighbor-cell) D2D signal resource pool. However, methods proposed by the present invention may be extended and applied to a situation in which D2D signals in a different form (e.g., D2D communication signals) are received. Furthermore, the proposed methods below may be restrictively applied to FDD carrier based D2D signal/D2DSS reception operation.

<Method 1>

According to the present invention, when an SRXCH_D2D RX UE receives D2DSSs associated with a (serving-cell/neighbor-cell) D2D signal resource pool, the SRXCH_D2D RX UE may be configured to assume, as INV_DL SFs, not only i) DL SFs at least some (i.e., some or all) of which overlap with corresponding D2DSS resources (or D2DSS SFs) in a time resource region but also ii) DL SFs at least some (i.e., some or all) of which overlap with a single preceding SF and a single following SF of D2DSS resources (or D2DSS SFs) (i.e., SFs for securing a time necessary for carrier (frequency band) switching operation of a single RX chain) in the time resource region.

In addition, when the SRXCH_D2D RX UE receives discovery signals and/or D2DSSs (associated with a previously set or signaled neighbor-cell discovery resource pool) in the neighbor-cell discovery resource pool, INV_DL SFs may be defined/configured according to at least some (i.e. some or all) of the following rules.

It is assumed that the SRXCH_D2D RX UE receives neighbor-cell related synchronization error information of w1 (or w2) (through predefined higher layer signaling) (refer to Table 4). In this case, i) the SRXCH_D2D RX UE assumes that a neighbor-cell D2DSS can be received within a range of "SF#N−w1" to "SF#N+w1" (i.e., when a neighbor-cell D2DSS resource is configured in serving-cell SF#N) or ii) the SRXCH_D2D RX assumes that a neighbor-cell discovery signal can be received within a range of "SF#K−w2" to "SF#K+w2" (i.e., when a neighbor-cell discovery resource is configured in serving-cell SF#K).

Example 1-1

According to a first embodiment of the present invention, the SRXCH_D2D RX UE needs to blind-search the range of "SF#N−w1" to "SF#N+w1" (i.e., when the neighbor-cell D2DSS resource is configured in serving-cell SF#N) in order to receive (or detect) the neighbor-cell D2DSS because of D2D RX neighbor-cell related synchronization error.

To the end, the SRXCH_D2D RX UE may be configured to assume, as INV_SFs, not only i) DL SFs at least some (i.e., some or all) of which overlap with a region from "SF#N−CEILING(w1)" to "SF#N+CEILING(w1)" in a time resource region but also ii) DL SFs at least some (i.e., some or all) of which overlap with a single preceding SF and a single following SF of the region from "SF#N−CEILING (w1)" to "SF#N+CEILING(w1)" (i.e., SFs for securing a time necessary for carrier (or frequency band) switching operation of a single RX chain) in the time resource region when receiving a neighbor-cell D2DSS (associated with a previously set or signaled neighbor-cell discovery resource pool).

In other words, the SRXCH_D2D RX UE assumes DL SFs, at least some (i.e., some or all) of which overlap with the region from "SF#N−CEILING(w1)−1" to "SF#N+CEILING(w1)+1" in the time resource region, as INV_DL SFs. Here, CEILING(X) refers to a function for deriving a minimum integer equal to or greater than X.

As another example, in the same situation as above, the SRXCH_D2D RX UE may be configured to finally assume DL SFs, at least some (i.e., some or all) of which overlap with a region from "SF#N−CEILING(w1)" to "SF#N+CEILING(w1)" in the time resource region, as INV_DL SFs (when w1 is less than a previously set or signaled threshold value, i.e., the time necessary for carrier (or frequency band) switching operation is secured without additionally configuring INV_SFs)

As another example, (in the same situation as above), the SRXCH_D2D RX UE needs to blind-search a range of "SF#P−w1" to "SF#P+w1" (i.e., when a neighbor-cell discovery resource is configured in serving-cell SF#P) in order to receive/detect a neighbor-cell discovery signal due to D2D RX neighbor-cell related synchronization error.

To this end, i) the SRXCH_D2D RX UE may be configured to assume DL SFs, at least some (i.e., some or all) of which overlap with a region from "starting SF−CEILING(w1)−1 in a neighbor-cell discovery pool" to "ending SF+CEILING(w1)+1 in the neighbor-cell discovery pool" in a time resource region, as INV_DL SFs, ii) the SRXCH_D2D RX UE may be configured to assume DL SFs, at least some (i.e., some or all) of which overlap with a region from "starting SF−CEILING(w1) in the neighbor-cell discovery pool" to "ending SF+CEILING(w1) in the neighbor-cell discovery pool" in the time resource region, as INV_DL SFs (when w1 is less than a previously set or signaled threshold value), or iii) the SRXCH_D2D RX UE may be configured to assume DL SFs, at least some (i.e., some or all) of which overlap with a region from "SF#P−CEILING(w1)−1" to "SF#P+CEILING(w1)+1" (or a region from "SF#P−CEILING(w1)" to "SF#P+CEILING(w1)" (when w1 is less than a previously set or signaled threshold value)) in the time resource region, as INV_DL SFs. (i.e., this can be interpreted as consideration of only SFs actually configured as discovery SFs from among SFs within a period to which a neighbor-cell discovery pool configuration related bitmap is applied when INV_DL SFs are configured)

As another example, if the ending SF of the period to which the (serving-cell/neighbor-cell) discovery pool configuration related bitmap is applied is a non-D2D SF (or non-discovery SF), DL SFs, at least some (i.e., some or all) of which overlap with a single SF following the ending SF in the time resource region, may not be assumed as INV_DL SFs.

As another example, if SFs are arranged in the order of "a non-D2D SF, a D2D SF and a non-D2D SF" in the period to which the (serving-cell/neighbor-cell) discovery pool configuration related bitmap is applied, DL SFs, at least some (i.e., some or all) of which overlap with a single preceding SF and a single following SF of the corresponding D2D SF, may be assumed as INV_DL SFs. Alternatively, if SFs are arranged in the order of "a non-discovery SF, a discovery SF and a non-discovery SF" in the period to which the (serving-cell/neighbor-cell) discovery pool configuration related bitmap is applied, DL SFs, at least some (i.e., some or all) of which overlap with a single preceding SF and a single following SF of the corresponding discovery SF, may be assumed as INV_DL SFs.

As another example, when D2DSS transmission is set in a (UL) SF in which the (serving-cell/neighbor-cell) discovery pool configuration related bitmap is not set to "1" (i.e., which indicates that a D2D SF (or discovery SF) is configured) or a (UL) SF in which the (serving-cell/neighbor-cell) discovery pool configuration related bitmap is not set to "1" is defined as a D2DSS resource within the period to which the (serving-cell/neighbor-cell) discovery pool configuration related bitmap is applied, D2DSS transmission may be exceptionally performed. Conversely, when D2DSS transmission is set in a (UL) SF in which the (serving-cell/neighbor-cell) discovery pool configuration related bitmap is not set to "1" (i.e., which indicates that a D2D SF (or discovery SF) is configured) or a (UL) SF in which the (serving-cell/neighbor-cell) discovery pool configuration related bitmap is not set to "1" is defined as a D2DSS resource within the period to which the (serving-cell/neighbor-cell) discovery pool configuration related bitmap is applied, D2DSS transmission may not be exceptionally performed.

As another example, when the SRXCH_D2D RX UE blind-searches a region from "SF#N−w2" to "SF#N+w2" (i.e., when a neighbor-cell D2DSS resource is configured in serving-cell SF#N) in order to receive/detect a neighbor-cell D2DSS (associated with a previously set or signaled neighbor-cell discovery resource pool) due to D2D RX neighbor-cell related synchronization error, the SRXCH_D2D RX UE may be configured to assume DL SFs, at least some (i.e., some or all) of which overlap with one of a region from "SF#N−1" to "SF#N+1", a region from "SF#N−CEILING(w2)−1" to "SF#N+CEILING(w2)+1" and a region from "SF#N−FLOOR(w2)−1" to "SF#N+FLOOR(w2)+1" in the time resource region, as INV_DL SFs.

As another example, in the same situation, the SRXCH_D2D RX UE needs to blind-search a region from "SF#P−w2" to "SF#P+w2" (i.e., when a neighbor-cell discovery resource is configured in serving-cell SF#P) in order to receive/detect a neighbor-cell discovery signal due to D2D RX neighbor-cell related synchronization error.

To this end, the SRXCH_D2D RX UE may be configured to assume DL SFs, at least some (i.e., some or all) of which overlap with one of i) a region from "starting SF−1 in a neighbor-cell discovery pool" to "ending SF+1 in the neighbor-cell discovery pool", ii) a region from "starting SF−CEILING(w2)−1 in the neighbor-cell discovery pool" to "ending SF+CEILING(w2)+1 in the neighbor-cell discovery pool" and iii) "starting SF−FLOOR(w2)−1 in the neighbor-cell discovery pool" to "ending SF FLOOR(w2)+1 in the neighbor-cell discovery pool" in the time resource region, as INV_DL SFs.

As another example, when a (RRC_IDLE) D2D UE needs to receive a paging signal (and/or SIB) (SF#N) while performing i) (neighbor/serving cell) discovery signal reception operation in a (neighbor/serving cell) D2D signal resource pool or ii) operation of receiving a (neighbor/serving cell) D2DSS associated with the (neighbor/serving cell) D2D signal resource pool according to application of the rule that "paging reception (and/or SIB reception) is prioritized over D2D reception" shown in Table 4, the D2D UE may be configured not to perform the discovery signal reception operation in SFs in the (neighbor/serving cell) D2D signal resource pool, at least some (i.e., some or all) of which overlap with a region from "SF#N−1" to "SF#N+1" (or "SF#N") in the time resource region.

As another example, when a (RRC_IDLE) D2D UE needs to receive a paging signal (and/or SIB) (SF#N) while performing i) (neighbor/serving cell) discovery signal reception operation in a (neighbor/serving cell) D2D signal resource pool or ii) operation of receiving a (neighbor/serving cell) D2DSS associated with the (neighbor/serving cell) D2D signal resource pool according to application of the rule that "paging reception (and/or SIB reception) is prioritized over D2D reception" shown in Table 4, the D2D UE may be configured not to perform the D2DSS reception operation in (neighbor/serving cell) D2DSS SFs, at least some (i.e., some or all) of which overlap with the region from "SF#N−1" to "SF#N+1" (or "SF#N") in the time resource region.

As another example, the D2D UE may be configured not to perform the discovery signal reception operation in a (neighbor/serving cell) D2D signal resource pool at least some (i.e., some or all) of which overlap with the paging signal (and/or SIB) reception time.

Example 1-2

According to the first embodiment of the present invention, when i) an interval between a previously signaled or set neighbor-cell D2DSS resource offset and a neighbor-cell discovery resource pool offset or ii) an interval between "SF#N+CEILING(w1)+1" (or "SF#N+CEILING(w1)") for configuring neighbor-cell D2DSS reception related INV_DL SFs described in example 1-1 and "starting SF−CEILING(w1)−1 in a neighbor-cell discovery pool" (or "starting SF−CEILING(w1) in the neighbor-cell discovery pool") for configuring neighbor-cell discovery reception related INV_DL SFs is less than a previously set or signaled threshold value, DL SFs, at least some (i.e., some or all) of which overlap with the region between "SF#N+CEILING (w1)+1" (or "SF#N+CEILING(w1)") for configuring neighbor-cell D2DSS reception related INV_DL SFs described in example 1-1 and "starting SF−CEILING(w1)−1 in a neighbor-cell discovery pool" (or "starting SF−CEILING(w1) in the neighbor-cell discovery pool") for configuring neighbor-cell discovery reception related INV_DL SFs in the time resource region, may be assumed/configured as INV_DL SFs. According to application of such assumption/configuration, frequent generation of carrier (or frequency band) switching operation of a single RX chain can be mitigated.

For example, if i) an interval between a previously signaled or set neighbor-cell D2DSS resource offset and a neighbor-cell discovery resource pool offset or ii) an interval between "SF#N+CEILING(w1)+1" (or "SF#N+CEILING (w1)") for configuring neighbor-cell D2DSS reception related INV_DL SFs described in example 1-1 and "starting SF−CEILING(w1)−1 in a neighbor-cell discovery pool" (or "starting SF−CEILING(w1) in the neighbor-cell discovery pool") for configuring neighbor-cell discovery reception related INV_DL SFs is greater than the previously set or signaled threshold value, DL SFs, at least some (i.e., some or all) of which overlap with the region between "SF#N+ CEILING(w1)+1" (or "SF#N+CEILING(w1)") for configuring neighbor-cell D2DSS reception related INV_DL SFs described in example 1-1 and "starting SF−CEILING (w1)−1 in a neighbor-cell discovery pool" (or "starting SF-CEILING(w1) in the neighbor-cell discovery pool") for configuring neighbor-cell discovery reception related INV_DL SFs in the time resource region, may not be assumed/configured as INV_DL SFs.

<Method 2>

As described above, a (serving-cell/neighbor-cell) D2DSS resource having previously fixed or set periodicity can be associated with a plurality of (serving-cell/neighbor-cell) D2D signal resource pools. Further, a single (serving-cell/neighbor-cell) D2DSS configuration may be used for a plurality of (serving-cell/neighbor-cell) D2D signal resource pools. For example, (serving-cell/neighbor-cell) D2DSS resource periodicity may be fixed to 40 ms.

Considering such characteristics, an SRXCH_D2D RX UE may configure INV_DL SFs based on method #1 in consideration of only an associated (serving-cell/neighbor-cell) D2DSS disposed before a (serving-cell/neighbor-cell) D2D signal resource pool that the UE intends to actually receive (i.e., the latest subframe of the D2DSS resource before the start of the discovery pool).

Alternatively, according to application of such configuration/assumption, the SRXCH_D2D RX UE may not configure INV_DL SFs in consideration of an associated (serving-cell/neighbor-cell) D2DSS disposed before a (serving-cell/neighbor-cell) D2D signal resource pool that the UE does not actually receive or does not want to actually receive. Through application of such configuration/assumption, excessive INV_DL SF configuration due to a (serving-cell/neighbor-cell) D2DSS can be alleviated.

As an example, such assumption/configuration may be restrictively applied to a case in which the SRXCH_D2D RX UE is instructed (by the serving cell) to perform (serving-cell/neighbor-cell) discovery reception operation only in a specific (serving-cell/neighbor-cell) D2D signal resource pool through predefined dedicated signaling (e.g., RRC signaling).

As another example, when INV_DL SFs related to reception of (serving-cell/neighbor-cell) D2DSSs associated with (serving-cell/neighbor-cell) D2D signal resource pools are configured according to method #1, the SRXCH_D2D RX UE may configure the INV_DL SFs in consideration of only an associated (serving-cell/neighbor-cell) D2DSS disposed before a (serving-cell/neighbor-cell) D2D signal resource pool (i.e., the latest subframe of the D2DSS resource before the start of a discovery pool).

<Method #3>

If it is difficult to achieve synchronization of a related/associated (serving-cell/neighbor-cell) D2D signal resource pool through reception of a single (serving-cell/neighbor-cell) D2DSS, Q (serving-cell/neighbor-cell) D2DSSs which are previously set or signaled and disposed before the (serving-cell/neighbor-cell) D2D signal resource pool may be received/used.

In this case, the SRXCH_D2D RX UE may be configured to set INV_DL SFs (according to method #1 or method #2) in consideration of the previously set or signaled Q (serving-cell/neighbor-cell) D2DSSs disposed before the (serving-cell/neighbor-cell) D2D signal resource pool.

Furthermore, a method of setting a usage index in relation with discovery pool configuration may be defined as shown in Table 5.

TABLE 5

The discovery pools RRC configuration can indicate a usage index per pool to reserve the pool for specific usages
If more than 1 resource pool with the same usage index is configured for type 1 discovery, the network configures the method for the UE to select the resource pool among the pools with a given usage index; the following methods are supported:
    Random, subject to meeting the UE and network power configurations
        Default if no other method is configured
    UE RSRP measurement
        For each pool, an upper RSRP value and a lower RSRP value are configured
        For each value: {−infinity, −110 . . . −60, +infinity} dBm, increments of 10 dB A method of efficiently configuring INV_DL SFs (or DL gap) will be additionally described. Operation shown in Table 4 is valid as an operation with respect to D2D discovery pools of a serving cell and a neighbor cell for which a window length of w2 is designated on the basis of Tables 3 and 4.

However, with respect to pools of neighbor cells for which a window length of w1 is designated, a margin of 1 ms before or after a discovery pool is not sufficient to accept ambiguity of cell timing. In other words, a DL gap needs to be defined as subframes belonging to neighbor-cell discovery resource pools on UL carriers, (ceil(w1)+1) subframes preceding the subframes and (ceil(w1)+1) subframes following the subframes.

In addition, a UE needs to receive a D2DSS appearing in the first subframe of the discovery pool or a D2DSS in the closest subframe before the discovery pool.

Considering this, it is necessary to configure D2DSS subframes associated with a neighbor-cell discovery pool, (ceil(w1)+1) subframes preceding the D2DSS subframes and (ceil(w1)+1) subframes following the D2DSS subframes as an (additional) DL gap.

Figure 14:
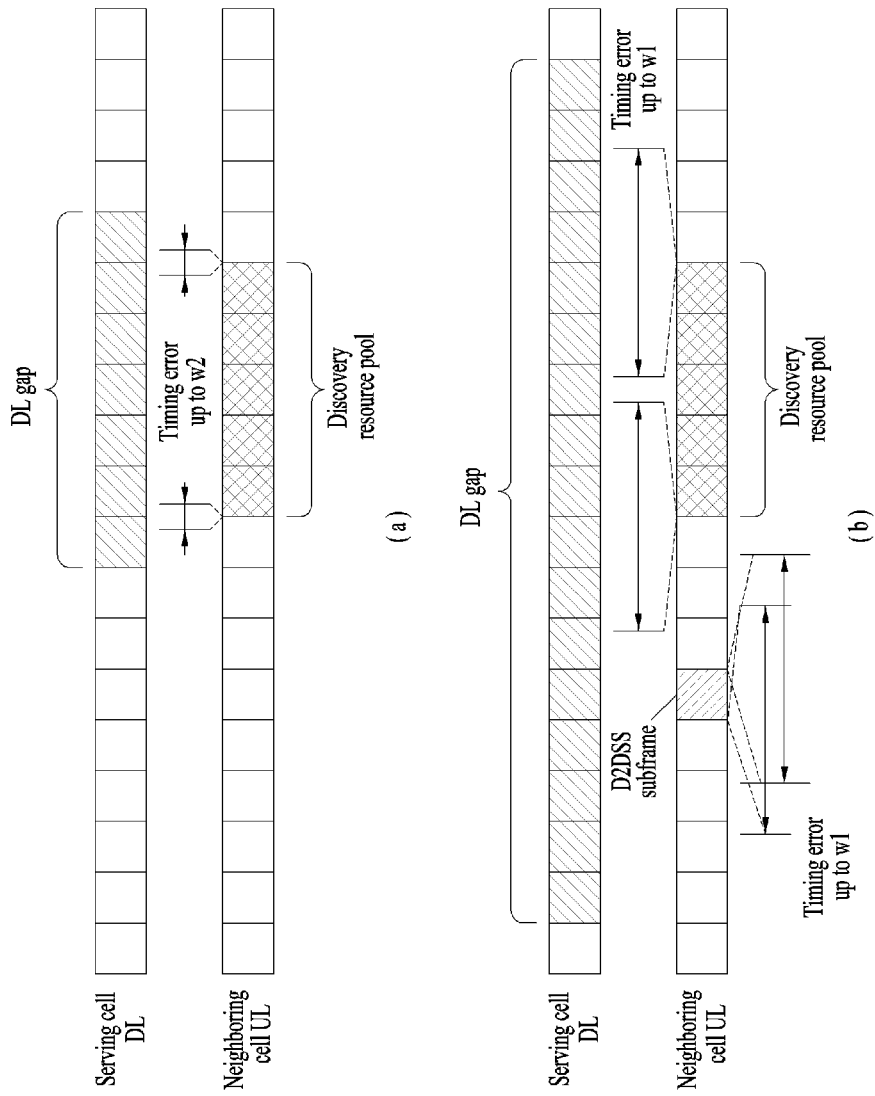
FIG. 14 is a reference diagram for comparison of DL gaps necessary for neighbor cells having synchronization window lengths of w2 and w1.

FIG. 14 is a reference diagram for comparison of DL gaps necessary for neighbor cells having synchronization window lengths of w2 and w1. FIG. 14(*a*) illustrates a DL gap necessary for a neighbor cell having the synchronization window length of w2 and FIG. 14(*b*) illustrates a DL gap necessary for a neighbor cell having the synchronization window length of w1.

Whether DL gaps for discovery pools and associated D2DSS subframes appear as continuous DL gaps or two independent (or separated) GL gaps may be additionally considered. In addition, whether a DL gap can be set for D2DSS subframes for UEs which cannot support D2DSSs may be considered.

For example, DL gaps associated with discovery can be applied to discovery pools of a serving cell or discovery pools of a neighbor cell having a synchronization window length of w2.

For a neighbor cell having a synchronization window length of w1, DL gaps may be set for discovery pools, D2DSS subframes associated with the discovery pools, (ceil(w1)+1) subframes preceding such subframes and (ceil (w1)+1) subframes following such subframes.

A description will be given of whether an eNB can control configuration of DL gaps for UEs. A DL gap may not be necessary for certain UEs depending on UE capability and carrier aggregation (CA) configuration.

For example, if a UE is capable of communication and discovery and downlink carrier aggregation (DL CA) capable of supporting simultaneous reception of WAN DL and D2D signals is set, a DL gap for the UE to receive discovery signals may not be needed.

Furthermore, even when the UE is not capable of D2D communication, UE capability signaling indicating (UE) conditions under which the UE requires a DL gap (or whether the UE requires a DL gap) may be defined (refer to Table 6).

TABLE 6

1. INTRODUCTION
    This contribution discusses the D2D UE capability. How to separate the features of Rel-12 D2D will be discussed first, and then how to define the D2D frequency bands will be discussed.
2. DISCUSSION
2.1 D2D FEATURES
    Considering many discussions on PS and non-PS services in D2D SI/WI, it is natural to separate the features of discovery and communication. In other words, a D2D-capable UE supports only communication, only discovery, or both of them. Regarding the two communication modes, we think that the following agreements made in RAN1#76 imply that a D2D communication capable UE shall support both modes. In our understanding the agreement, a D2D communication capable UE shall be able to be a transmitting UE using Mode 1 when it is inside network coverage, and, at the same time, it also shall be able to be a transmitting UE using Mode 2 when it is at the edge-of-coverage and/or outside network coverage. The definition "edge-of-coverage" is not cleared specified, but we think that it can include the exceptional case which uses Mode 2 for the resource allocation.
Agreements (RAN1#76):
    From a transmitting UE perspective a UE can operate in two modes for resource
    allocation:
        Mode 1: eNodeB or rel-10 relay node schedules the exact resources used by a
        UE to transmit direct data and direct control information
            FFS: if semi-static resource pool restricting the available resources for
            data and/or control is needed
        Mode 2: a UE on its own selects resources from resource pools to transmit
        direct data and direct control information
            FFS if the resource pools for data and control are the same
            FFS: if semi-static and/or pre-configured resource pool restricting the
            available resources for data and/or control is needed
        D2D communication capable UE shall support at least Mode 1 for in-coverage
        D2D communication capable UE shall support Mode 2 for at least edge-of-
        coverage and/or out-of-coverage
        FFS: Definition of out-of-coverage, edge-of-coverage, in-coverage
    It may be possible to separate the two discovery types in the supported features. On the other hand, the difference in the transmitter behavior in the two types may not be significant: The resource allocation within each discovery period would be identical, and the only difference is random selection vs. deterministic resource hopping across discovery periods. We note that the receiver behavior is expected to be identical in the two discovery types, i.e., a receiver UE blindly searches each reception pool with no knowledge about the discovery type used in the transmitters.
    The D2DSS-related feature can be separated from the features of communication and discovery. For example, if a UE is intended to be operated only inside the coverage of synchronized networks, the D2DSS-related operations do not need to be implemented. It is noteworthy that, even a UE not capable of D2DSS can support inter-cell D2D in un-synchronized networks because high layer signaling provides the cell ID together with the resource pools of neighboring cells [1] and such a UE can receive D2D signals from neighboring cell UEs by using PSS/SSS/CRS. Details of D2DSS features can be different in discovery and communication. By the following agreement, D2DSS in discovery does not require any PD2DSCH-related operations, while a TABLE 6-continued communication UE should be able to transmit PD2DSCH if it can transmit D2DSS.
Agreement:
    Communication UEs transmitting D2DSS transmit PD2DSCH in in-coverage, out of
    coverage cases
    In coverage UEs participating only in discovery do not transmit PD2DSCH
Considering that D2DSS sequences are divided into two sets, D2DSSue_net and D2DSSue_oon, a UE capable
of only discovery does not need to transmit/receive a D2DSS belonging to D2DSSue_oon. This leads to two
different features, one for D2DSSue_net and the other for PD2DSCH. By the above agreement, supporting
PD2DSCH means supporting D2DSS as well, thus the feature PD2DSCH can have D2DSSue_net and
D2DSSue_oon as the prerequisite. It would be a natural consequence that a UE which is not capable of D2DSS
cannot transmit or receive D2D communication when it is outside network coverage, but such a UE may be able
to communicate with some out-coverage UEs if these out-coverage UEs are synchronized to the serving cell
timing which is relayed by D2DSS transmitted from some other in-coverage UEs.
    The above discussions lead to the D2D features listed in Table 1. Some D2D feature combinations are
listed in Table 2, and we note that more combinations can be considered, e.g., Feature B + D in the future
releases
where discovery for out-NW UEs is necessary.

Table 1: List of the D2D features

| Feature | Description |
|---|---|
| D2DSSue_net (Feature A) | The UE can transmit and receive D2DSS in D2DSSue_net. |
| PD2DSCH (Feature B) | The UE can transmit and receive D2DSS in D2DSSue_oon and PD2DSCH. The feature A is the prerequisite. |
| D2D communication (Feature C) | The UE can transmit and receive SA and data using Mode 1 and Mode 2. |
| D2D discovery (FeatureD) | The UE can transmit and receive discovery messages. FFS whether further separation is necessary for Type 1 and Type 2B. |

Table 2: Examples of D2D feature combinations

| Example case | Description |
|---|---|
| Case 1: Discovery without D2DSS | Feature D only. Inter-cell discovery can be supported by using neighboring cell's PSS/SSS/CRS. |
| Case 2: Discovery with D2DSS | Feature A + D. Inter-cell discovery based on D2DSS is supported. |
| Case 3: D2D communication without D2DSS | Feature C only. Inter-cell communication can be supported by using neighboring cell's PSS/SSS/CRS. |
| Case 4: D2D communication with D2DSS | Feature B + C (A is the prerequisite of B). Inter-cell communication based on D2DSS is supported. Communication outside network coverage is supported. |
| Case 5: Discovery and communication without D2DSS | Feature C + D. Inter-cell discovery and communication can be supported by using neighboring cell's PSS/SSS/CRS. |
| Case 6: Discovery and communication with D2DSS | Feature B + C + D (A is the prerequisite of B). Inter-cell discovery and communication based on D2DSS is supported. Communication outside network coverage is supported. |

Proposal 1: As the baseline, four D2D features are defined for D2DSSUE_net, PD2DSCH (including
D2DSSue_net and D2DSSue_oon), D2D communication, and D2D discovery. Inter-cell D2D or out-
coverage D2D can be supported by a proper combination of these features.
2.2 D2D FREQUENCY BANDS
    In general, the eNB needs to know the D2D frequency bands supported by each UE. This knowledge is
necessary especially for the assessment of impact across D2D and WAN which appears differently in the D2D
reception and D2D transmission.
A. ISSUES IN D2D RECEPTIONS
    It seems natural to define a list of frequency bands in which the UE can receive D2D. In defining the related
UE capability, the impact of D2D reception on the WAN operation needs to be addressed together. First, in
relation to WAN RX, the related agreement can be summarized as follows:
    For communication, receiving D2D in a FDD UL band may reduce the DL CA/MIMO capability [2].
    For discovery, receiving D2D in a FDD UL band requires "DL gap" in the paired DL band. FFS
    whether eNB can control the configuration of such DL gap [3].
One solution to reflect the agreement for communication can be to inform the network of the DL CA/MIMO
capability which will be supported if the UE needs to participate in receiving communication in a certain
frequency band. In other words, a UE reports the frequency band where D2D communication reception is
supported with a certain DL CA band combination and MIMO capability. Detailed capability signaling design
can be discussed in RAN2. In discovery reception capability, if it is supported for the eNB to control the
configuration of "DL gap" for discovery [4], it can be useful if the eNB knows in which condition a certain UE
requires such DL gap. We note that the discussed capability signaling for communication and discovery share
the commonality that it describes the impact of D2D reception on WAN DL reception, so a common signaling
structure may be feasible.
Proposal 2: For communication, a UE reports the frequency band(s) where it supports D2D
communication reception per each supported band combination. It can be discussed whether the same
capability signaling is also used to report the impact of D2D discovery on WAN DL reception.
    Another issue is related to WAN TX as per the agreement of supporting "Simultaneous D2D RX on CC1
and WAN TX on CC2 from RAN1 perspective." As this feature is related to the frequency separation and UE
implementation, it seems reasonable to inform the network of the band combination in which this simultaneous
operation is supported. To be specific, a UE can indicate a list of {CC1, CC2}, each of which represents the
band combination in which the simultaneous D2D RX on CC1 and WAN TX on CC2 is supported (or such
simultaneous operation is not supported equivalently). Based on this information, the eNB can decide in which TABLE 6-continued combination of D2D RX and WAN TX UL scheduling restriction is necessary for a UE participating in D2D reception.
Proposal 3: A UE reports a list of band combinations, each of which represents the support (or no support) of simultaneous D2D RX and WAN TX.
B. ISSUES IN D2D TRANSMISSIONS
  The network needs to know the set of frequency bands on which a UE can transmit D2D. It can be further discussed whether a D2D-capable UE can transmit D2D on a carrier frequency if it can transmit WAN in the same carrier. If the answer is yes, no additional band combination signaling is necessary to indicate the carrier frequency in which D2D TX is supported.
  In the last meeting, it was agreed to support "simultaneous D2D TX on CC1 and WAN TX on CC2 from RAN1 perspective." As discussed in [5], the feasibility of such simultaneous TX is dependent of the TX timing of D2D and WAN. When the transmit timing of the two carriers is the same, it is basically the same as conventional UL CA from the RF point of view, so no specific issues are expected other than handling the power limited case which is discussed in [6]. On the other hand, supporting misaligned simultaneous transmission has been up to the UE capability so far. Multiple timing advance group (TAG) was introduced in Rel-11, and if two carriers belong to different TAGs in the UE capability, the UE can support simultaneous transmissions as far as the timing misalignment is not greater than 32.47 us. If UE is not able to support misaligned transmissions of WAN UL in the two carriers, the maximum supported timing misalignment is zero for the two carriers and it can be assumed that simultaneous TX of D2D and WAN is not supported with misaligned timing. To generalize this, it can be assumed that, for a given combination of two carriers, there is an upper bound and the UE can support simultaneous transmissions if the timing misalignment is not greater than the upper bound.
  As an effort to minimize the related specification work, it can be the baseline to reuse the existing UE capability for the indication of D2D TX capability. In other words, a UE can transmit WAN in CC1 and CC2, it can transmit D2D in CC1 as long as the timing difference from the WAN TX in CC2 does not exceed the upper bound in the capability of the UE.
Proposal 4: As the baseline, it is assumed that a UE supports simultaneous TX of D2D on a carrier and WAN UL on another carrier if the two carriers belong to the supported band combination for WAN TX and the timing difference is less than the upper bound in its capability.

Accordingly, to minimize DL subframe loss, controllability for DL gaps for UE-specific discovery is required.

When it is assumed that DL gaps are controlled by an eNB, whether to set DL gaps for a specific resource pool and/or a specific cell needs to be determined. A UE may have no interest in reception of a discovery signal transmitted in a pool having a specific usage index. Further, the UE may not receive a discovery signal transmitted from a specific neighbor cell due to a distance from the cell.

Therefore, according to the present invention, the eNB can control DL gap configuration pool-specifically/neighbor-cell-specifically.

A description will be given of a method through which a UE having a single RX chain performs DL WAN operation in a DL gap. For example, when PHICH reception timing belongs to the DL gap, the UE may assume the corresponding PHICH as ACK and report the same to a higher layer thereof in order to prevent unintended PUSCH retransmission.

Furthermore, when a CSI reference resource (e.g., subframe #n) related to a CSI report belongs to the DL gap, the CSI reference resource may be replaced by a closest valid DL subframe (which is not included in the DL gap) prior to subframe #n. In this case, the UE may be defined to report a predefined CSI value. Further, an operation related to a DRX counter may be defined. For example, the UE can receive a PDCCH in another serving cell (i.e., another aggregated carrier) which does not receive a D2D discovery signal and thus can maintain (or perform) DRX counting even in the DL gap.

<Method #4>

When INV_DL SFs are configured according to the aforementioned method #1/method #2/method #3, an SRXCH_D2D RX UE may be configured to perform WAN communication according to at least some (i.e., some or all) of the following examples 4-1 to 4-3.

Example 4-1

For example, when (periodic/aperiodic) CSI information calculation/derivation related interference measurement resource (IMR) reported at a specific time is disposed in an INV_DL SF, the SRXCH_D2D RX UE may be configured to assume the IMR to be invalid. Here, such a CSI report may be performed/calculated by (re)using an IMR disposed in a closest (or preceding) non-INV_DL SF prior to the INV_DL SF or may be omitted, or predefined CSI having a specific value (e.g., OOR (out-of-range) CSI) may be reported.

For example, when (periodic/aperiodic) CSI information calculation/derivation related CSI reference resource reported at a specific time is an INV_DL SF, the SRXCH_D2D RX UE may be configured to assume the CSI reference resource to be invalid. Here, such a CSI report may be performed/calculated by (re)using/(re)assuming a DL SF that simultaneously satisfies conditions of a closest (or preceding) non-INV_DL SF prior to the INV_DL SF and valid DL SFs as a CSI reference resource or may be omitted, or a predefined CSI having a specific value (e.g., OOR CSI) may be reported.

In addition, application of example 4-1 may be interpreted as an operation of not using the INV_DL SF for CSI measurement. Here, CSI measurement refers to at least one of desired signal measurement and interference measurement. As another example, WAN communication related CSI measurement instead of D2D signal reception may be performed in the corresponding INV_DL SF. As another example, the INV_DL SF may be configured not to be used for RRM and/or RLM.

Example 4-2

When example 4-1 is applied, a (periodic/aperiodic) CSI information calculation related valid CSI reference resource reported at a specific time may be configured to be re-searched only within a previously defined or signaled time window (referred to hereinafter as "WIN_SIZE"). Here, when such a time window is set, excessive outdated CSI information reporting can be alleviated.

As a specific example, when a (periodic/aperiodic) CSI information calculation/derivation related CSI reference resource reported in SF#R, SF#(R-4), is an INV_DL SF, a closest (or preceding) CSI reference resource prior to SF#(R-4), which simultaneously satisfies conditions of non-INV_DL SFs and valid DL SFs, is re-searched only within the range of "SF#(R-4-1)" to "SF#(R-4-WIN_SIZE)" according to the above configuration/assumption.

As another example, when SF#(R-5) in which a (periodic/aperiodic) CSI information calculation related valid IMR reported in SF#R is an INV_DL SF, a closest (or preceding) IMR prior to SF#(R-5), which satisfies conditions of IMRs disposed in non-INV_DL SFs, is re-searched only within the range of "SF#(R-5-1)" to "SF#(R-5-WIN_SIZE)" according to the above configuration/assumption.

In addition, when example 4-2 is applied, if a valid CSI reference resource and/or a valid IMR are not present or reselected within a re-search region based on a previously defined or signaled time window, a corresponding CSI report may be omitted or predefined CSI having a specific value (e.g., OOR CSI) may be reported.

Example 4-3

For example, when D2D communication and operation of dynamically changing usage of radio resources (i.e., "EIMTA MODE") are simultaneously configured for UE#Z with a single RX chain and a subframe related to monitoring (or reception) of an indicator (i.e., "EIMTA DCI") related to dynamic radio resource usage change is set to an INV_DL SF, UE#Z may be configured not to perform EIMTA DCI monitoring (or reception) in the INV_DL SF. As another example, UE#Z may be configured to perform EIMTA DCI monitoring (or reception) instead of D2D signal reception in the INV_DL SF.

As another example, reception of a predefined specific WAN downlink signal takes precedence over at least one of i) reception of a (serving-cell/neighbor-cell related) D2D signal, ii) reception of a (serving-cell/neighbor-cell related) discovery signal and iii) reception of a (serving-cell/neighbor-cell) D2DSS associated with a (serving-cell/neighbor-cell) D2D signal resource pool, as shown in Table 3. Here, the WAN downlink signal may be defined as paging (and/or SIB).

When such definition is applied, if a D2D UE needs to receive a paging signal (and/or SIB) (SF#N) during operation of receiving a (neighbor/serving-cell) discovery signal in a (neighbor/serving-cell) D2D signal resource pool or operation of receiving a (neighbor/serving-cell) D2DSS associated with the (neighbor/serving-cell) D2D signal resource pool, i) the D2D UE may be configured not to perform the discovery signal reception operation in SFs in the (neighbor/serving-cell) D2D signal resource pool, at least (i.e., some or all) of which overlap with a region from "SF#N−1" to "SF#N+1" (or "SF#N") in the time resource region and/or ii) the D2D UE may be configured not to perform the D2DSS reception operation in (neighbor/serving-cell) D2DSS SFs (or D2DSS resources) at least (i.e., some or all) of which overlap with the region from "SF#N−1" to "SF#N+1" (or "SF#N") in the time resource region (i.e., the D2D UE performs (at least) paging signal (and/or SIB) reception operation in SF#N).

For example, at least one of i) PHICH reception (which is not performed/valid in INV_DL SFs due to application of method #4), EIMTA DCI reception, random access response reception, message 4 (i.e., contention resolution message) reception (in a contention-based random access procedure) and PHICH reception related to message 3 (e.g., PUSCH) (re)transmission (in the contention-based random access procedure) may be performed in "SF#N" (or the region from "SF#N−1" to "SF#N+1") and/or ii) at least one of an IMR resource or a CSI reference resource in "SF#N" (or the region from "SF#N−1" to "SF#N+1") may be assumed to be valid. Here, such configuration may be restrictively applied to SRXCH_D2D RX UEs.

As another example, at least one of i) PHICH reception, EIMTA DCI reception, random access response reception, message 4 (i.e., contention resolution message) reception (in a contention-based random access procedure) and PHICH reception related to message 3 (e.g., PUSCH) (re)transmission (in the contention-based random access procedure) may not be permitted in "SF#N" (or the region from "SF#N−1" to "SF#N+1") and/or ii) at least one of an IMR resource or a CSI reference resource in "SF#N" (or the region from "SF#N−1" to "SF#N+1") may be assumed to be invalid.

An example of simultaneous D2D signal (i.e., UL spectrum)/WAN downlink signal (i.e., DL spectrum) reception capability/operation of a D2D UE in an FDD environment is shown in Table 7.

TABLE 7

For communication, UE is able to receive simultaneously on the DL and UL spectrum of FDD carriers supporting D2D
For discovery, UE may not be able to receive simultaneously on the DL and UL spectrum of FDD carriers supporting D2D
Send LS to RAN2, RAN4, and SA2
   RAN2:
      To investigate impact on UE capability signalling of restriction on cellular operation when D2D is operated
      [Public safety UEs are assumed to be able to simultaneously perform cellular on DL carrier and D2D on associated UL carrier for FDD band]
      For discovery, non-public safety UE may not be able to receive simultaneously on the DL and UL spectrum of FDD carriers supporting D2D
      There is no simultaneous operation of CA and D2D required for Rel-12 D2D communication if we assume 2 DL CA capable UEs
   RAN4:
      RAN1 asks feasibility and implication of simultaneous reception of cellular on DL spectrum and D2D associated UL spectrum for FDD band
      RAN1 asks feasibility and implication of single receiver chain switching between cellular spectrum and D2D reception associated UL spectrum for FDD band
   SA2:
      [Public safety UEs are assumed to be able to simultaneously perform cellular on one carrier and D2D on another carrier]

<Method #5>

INV_DL SFs, which are configured on the basis of at least some (i.e., some or all) of the above-described proposed methods (e.g., method #1, method #2, method #3 and method #4), may not be configured when at least some (i.e., some or all) of the following conditions are satisfied. Here, method #5 may be restrictively applied only when D2D operation is performed in an FDD system environment (DL and UL spectrum of FDD carriers supporting D2D).

Example 5-1

For example, if a D2D UE simultaneously receives a D2D communication signal and a D2D discovery signal on the same (UL) carriers (or (UL) spectrum), INV_DL SFs may not be configured because the D2D UE includes a D2D receiver for D2D communication reception according to "for communication, RAN1 assumes that UE is able to receive simultaneously on the DL and UL spectrum of FDD carriers supporting D2D" of Table 7.

As another example, when the D2D UE can signal whether INV_DL SFs need to be configured, if the D2D UE signals that INV_DL SFs need not be configured, the INV_DL SFs may not be configured.

As another example, when the D2D UE can signal whether a DL gap needs to be set, if the D2D UE signals that the DL gap needs not be set, the DL gap may not be set.

Example 5-2

For example, D2DSS related INV_DL SFs, which are configured on the basis of at least one of method #1, method #2, method #3 and method #4, may not be configured if a D2D UE is not capable of supporting D2DSS TX/RX. Here, if such UE capability is signaled or reported, an eNB/network may be configured to signal whether D2DSS related INV_DL SFs are configured through predefined signaling (e.g., dedicated (RRC) signaling and SIB).

Example 5-3

For example, i) when a previously set or signaled neighbor-cell discovery pool associated (neighbor-cell) D2DSS measurement value is equal to or smaller than a previously set or signaled threshold value (i.e., when a neighbor cell is determined to be located at a distance from a serving cell/D2D RX UE) and/or ii) when a (modified) RSRP value (or (modified) RSRQ value) of the neighbor cell is equal to or smaller than a previously set or signaled threshold value (i.e., when the neighbor cell is determined to be located at a distance from the serving cell (or a D2D RX UE), D2DSS related INV_DL SFs (or DL gaps) and/or discovery pool related INV_DL SFs (or DL gaps), which are configured according to at least some (i.e., some or all) of the above-described proposed methods (e.g., method #1, method #2, method #3 and method #4), may not be configured.

As another example, i) when a previously set or signaled neighbor-cell discovery pool associated (neighbor-cell) D2DSS measurement value is equal to or greater than the previously set or signaled threshold value (i.e., when the neighbor cell is determined to be located at a distance from the serving cell/D2D RX UE) and/or ii) when the (modified) RSRP value (or (modified) RSRQ value) of the neighbor cell is equal to or greater than the previously set or signaled threshold value (i.e., when the neighbor cell is determined to be located at a distance from the serving cell (or the D2D RX UE), D2DSS related INV_DL SFs (or DL gaps) and/or discovery pool related INV_DL SFs (or DL gaps), which are configured according to at least some (i.e., some or all) of the above-described proposed methods (e.g., method #1, method #2, method #3 and method #4), may not be configured.

Here, if the D2D UE reports, to the serving cell, at least one of i) information about whether the previously set or signaled neighbor-cell discovery pool associated (neighbor-cell) D2DSS measurement value is equal to or smaller than the previously set or signaled threshold value, ii) information about whether the previously set or signaled neighbor-cell discovery pool associated (neighbor-cell) D2DSS measurement value is equal to or greater than the previously set or signaled threshold value, iii) neighbor-cell discovery pool associated (neighbor-cell) D2DSS measurement value information, iv) information about whether the (modified) RSRP value (or (modified) RSRQ value) of the neighbor cell is equal to or smaller than the previously set or signaled threshold value, v) information about whether the (modified) RSRP value (or (modified) RSRQ value) of the neighbor cell is equal to or greater than the previously set or signaled threshold value and vi) (modified) RSRP value (or (modified) RSRQ value) information, the serving cell may UE-specifically or cell-specifically signal whether D2DSS related INV_DL SFs (or DL gaps) and/or discovery pool related INV_DL SFs (or DL gaps) are configured through predefined signaling (e.g., dedicated (RRC) signaling and SIB) upon reception of the corresponding information.

Furthermore, the eNB (or serving cell) may UE-specifically or cell-specifically designate (neighbor) cells having D2DSS SFs and/or discovery (pool) SFs for which INV_DL SFs (or DL gaps) are configured.

As another example of the proposed methods, the aforementioned INV_DL SFs (or DL gaps) may be configured only in DL CCs (or DL cells) associated/paired with a (discovery) cell corresponding to a usage index desired by a UE or configured by an eNB only in (DL CCs (or DL cells) associated/paired with) a (discovery) pool corresponding to a specific usage index (or a specific (discovery) pool), as shown in Table 4.

As another example of the proposed methods, INV_DL SFs (or DL gaps) may not be configured for a cell to which synchronization error information (related to reception of a discovery signal and/or a D2DSS (associated with the corresponding discovery pool)) of w1 is signaled, and at least one of i) discovery, ii) discovery signal reception operation and iii) operation of receiving a D2DSS (associated with the corresponding discovery pool) may be performed in a best effort manner.

As another example of the proposed methods, INV_DL SFs (or DL gaps) may be configured for a cell to which synchronization error information (related to reception of a discovery signal and/or a D2DSS (associated with the corresponding discovery pool)) of w1 is signaled like a cell to which synchronization error information (related to reception of a discovery signal and/or a D2DSS (associated with the corresponding discovery pool)) of w2 is signaled, and capability reduction due to such configuration may be accepted.

Here, for a cell to which discovery pool (and/or a D2DSS (associated with the discovery pool)) reception related synchronization error information w1 is signaled, i) DL SFs, at least some (i.e., some or all) of which overlap with the region from "starting SF-CEILING(w1)-1 in the neighbor-cell discovery pool" to "ending SF+CEILING(w1)+1 in the neighbor-cell discovery pool" in the time resource region, may be assumed to be INV_DL SFs (or DL gaps) and/or ii) DL SFs, at least some (i.e., some or all) of which overlap with the region from "SF#N-CEILING(w1)-1" to "SF#N+CEILING(w1)+1" in the time resource region, may be assumed to be INV_DL SFs (or DL gaps) (e.g., when neighbor-cell D2DSS resources are configured in serving-cell SF#N) as described in example 1-1 of method #1.

Conversely, for a cell to which discovery pool (and/or a D2DSS (associated with the discovery pool)) reception related synchronization error information of w2 is signaled, i) DL SFs, at least some (i.e., some or all) of which overlap with the region from the starting SF-1 in the neighbor-cell discovery pool to the ending SF+1 in the neighbor-cell discovery pool in the time resource region, may be assumed to be INV_DL SFs (or DL gaps) and/or ii) DL SFs, at least some (i.e., some or all) of which overlap with the region from "SF#N-1" to "SF#N+1" in the time resource region, may be assumed to be INV_DL SFs (or DL gaps) (e.g., when neighbor-cell D2DSS resources are configured in serving-cell SF#N) as described in example 1-1 of method #1.

A description will be given of methods of efficiently configuring the aforementioned INV_DL SFs (or DL gaps) when a D2D RX UE with a single RX chain (referred to hereinafter as "SRXCH_D2D RX UE") or a shared D2D/cellular RX chain (referred to hereinafter as "SHRXCH_D2D RX UE") performs i) D2D discovery signal reception operation on a different (UL) carrier at an inter-frequency or ii) D2D discovery signal reception operation on a different PLMN (UL) carrier based on inter-PLMN. Here, the SHRXCH_D2D RX UE (or SRXCH_D2D RX UE) may be interpreted as a UE that uses a (relatively small number of or single) RX chain thereof for D2D RX and WAN DL RX alternately or in a sharing manner. Further, the proposed methods below may be extended and applied to not only a situation in which carrier aggregation (CA) is applied but also a situation in which a single cell is configured.

The following table 8 shows WAN DL signal reception operation (i.e., configuration of INV_DL SFs (or DL gaps)) assumed by the SHRXCH_D2D RX UE (or SRXCH_D2D RX UE) during D2D discovery signal reception.

TABLE 8

For FDD carriers:
  A UE with a shared D2D/cellular Rx chain (or a UE with a single Rx chain) and is receiving D2D discovery signals on an UL carrier is not expected to read DL signals on the DL carrier paired to such UL carrier during the subframes belonging to the D2D discovery pools on that UL carrier as well as one subframe preceding and following these subframes.

<Method #6>

When a UE (e.g., a D2D RX UE with a single RX chain) (or a SRXCH_D2D RX UE (e.g., a D2D RX UE with a shared D2D/cellular RX chain)) performs i) D2D discovery signal reception operation on a different (UL) carrier at an inter-frequency or ii) D2D discovery signal reception operation on a different PLMN (UL) carrier based on inter-PLMN, the aforementioned INV_DL SFs (or DL gaps) may be configured on the basis of at least some (i.e., some or all) of rules/configurations described in examples 6-1 to 6-8 below. For example, the SHRXCH_D2D RX UE (or SRXCH_D2D RX UE) may be interpreted as a UE that uses a (relatively small number of or single) RX chain thereof for D2D RX and WAN DL RX alternately or in a sharing manner. Further, the proposed methods below may be extended and applied to not only a situation in which carrier aggregation (CA) is applied but also a situation in which a single cell is configured.

For convenience of description of the proposed methods, it is assumed that the SHRXCH_D2D RX UE (or SRXCH_D2D RX UE) performs D2D discovery signal reception operation on a different (UL) carrier (or a different PLMN (UL) carrier) (referred to hereinafter as "DIFF_CC") at an inter-frequency in a situation in which two cells (i.e., primary cell #A (i.e., DL CC#A and UL CC#A) and secondary cell #B (i.e., DL CC#B and UL CC#B)) are configured.

Furthermore, the different (UL) carrier at the inter-frequency may be designated as UL CC#A of PCell #A (inter-frequency UL CC from the viewpoint of SCell #B (UL CC#B/DL CC#B)) or UL CC#B of SCell #B (inter-frequency UL CC from the viewpoint of PCell #A (UL CC#A/DL CC#A)).

For example, method #6 may be extended and applied to a case in which D2D discovery signal reception is performed on DIFF_CC when three or more cells (or a single cell) are configured. For example, method #6 can be extended and applied to a case in which DIFF_CC is set to a serving cell and/or a neighbor cell.

Example 6-1

When the SHRXCH_D2D RX UE (or SRXCH_D2D RX UE) performs D2D discovery signal reception on DIFF_CC, the SHRXCH_D2D RX UE may configure INV_DL SFs (or DL gaps) in all DL CCs (e.g. DL CC#A and DL CC#B) thereof which are configured through CA. Here, application of such configuration/rule may be interpreted as determination of whether an INV_DL SF (or DL gap) is configured in a specific (serving-cell related) DL CC depending on whether D2D discovery signal reception is performed in DIFF-CC rather than whether the specific (serving-cell related) DL CC is in a paired DL CC relationship with DIFF-CC.

Example 6-2

When the SHRXCH_D2D RX UE (or SRXCH_D2D RX UE) performs D2D discovery signal reception in DIFF_CC, the SHRXCH_D2D RX UE may configure INV_DL SFs (or DL gaps) only in previously defined or signaled serving-cell related DL CCs from among DL CCs thereof (or serving cells), which are configured through CA.

Here, i) (virtual) pairing may be designated between the DL CCs in which INV_DL SFs (or DL gaps) are configured and DIFF_C or ii) the DL CCs in which INV_DL SFs (or DL gaps) are configured may be interpreted as (virtual) paired DL CCs of DIFF_CC.

Further, when the SHRXCH_D2D RX UE (or SRXCH_D2D RX UE) performs D2D discovery signal reception in DIFF_CC, information about i) the DL CCs in which the INV_DL SFs (or DL gaps) are configured or ii) serving cells may be signaled/defined as a pair/combination of "information on a (UL) CC (or serving cell) in which a D2D discovery pool is configured" and "information on DL CCs (or serving cells) in which the INV_DL SFs (or DL gaps) are configured when D2D discovery signal reception is performed in the (UL) CC (or serving cell) in which the D2D discovery pool is configured.

Example 6-3

When the SHRXCH_D2D RX UE (or SRXCH_D2D RX UE) performs D2D discovery signal reception in DIFF_CC, the SHRXCH_D2D RX UE may configure INV_DL SFs (or DL gaps) only in a DL CC (e.g., DL CC#A) of a PCell from among DL CCs thereof which are configured through CA. Here, application of such method may be interpreted as determination of whether the INV_DL SFs (or DL gaps) are configured in the DL CC (e.g., DL CC#A) of the PCell depending on whether D2D discovery signal reception is performed in DIFF_CC rather than whether D2D discovery signal reception is performed in a paired UL CC (e.g., UL CC#A) of the PCell.

Example 6-4

When the SHRXCH_D2D RX UE (or SRXCH_D2D RX UE) performs D2D discovery signal reception in DIFF_CC, the SHRXCH_D2D RX UE may configure INV_DL SFs (or DL gaps) only in DL CCs (e.g., DL CC#B) of SCells other than the PCell from among DL CCs thereof which are configured through CA. Here, application of such method may be interpreted as determination of whether the INV_DL SFs (or DL gaps) are configured in the DL CCs (e.g., DL CC#B) of the SCells depending on whether D2D discovery signal reception is performed in DIFF_CC rather than whether D2D discovery signal reception is performed in paired UL CCs (e.g., UL CC#A) of the SCells.

Example 6-5

In the above examples (e.g., example 6-1, example 6-2, example 6-3 and example 6-4), when a discovery pool in DIFF_CC and/or synchronization error information related to reception of a D2DSS (associated with the discovery pool) are signaled through w1, i) DL SFs of DL CCs selected or designated on the basis of the above examples, at least some (i.e., some or all) of which overlap with the region from "the starting SF-CEILING(w1)-1 in the DIFF_CC discovery pool" to "the ending SF+CEILING(w1)+1 in the DIFF_CC discovery pool" in the time resource region, are assumed as INV_DL SFs (or DL gaps) and/or ii) DL SFs of DL CCs selected or designated on the basis of the above examples, at least some (i.e., some or all) of which overlap with the region from "SF#N-CEILING(w1)-1" to "SF#N+CEILING(w1)+1" in the time resource region, are assumed as INV_DL SFs (or DL gaps) (i.e., when a DIFF_CC D2DSS resource is configured in serving-cell SF#N). Such configuration/rule may be defined to be restrictively applied to a case in which DIFF_CC is a neighbor cell (and/or a serving cell and/or a different PLMN (UL) carrier).

As another example, when a discovery pool in DIFF_CC and/or synchronization error information related to reception of a D2DSS (associated with the discovery pool) are signaled through w2, i) DL SFs of DL CCs selected or designated on the basis of the above examples, at least some (i.e., some or all) of which overlap with the region from "the starting SF−1 in the DIFF_CC discovery pool" to "the ending SF+1 in the DIFF_CC discovery pool" in the time resource region, are assumed as INV_DL SFs (or DL gaps) and/or ii) DL SFs of DL CCs selected or designated on the basis of the above examples, at least some (i.e., some or all) of which overlap with the region from "SF#N−1" to "SF#N+1" in the time resource region, are assumed as INV_DL SFs (or DL gaps) (i.e., when a DIFF_CC D2DSS resource is configured in serving-cell SF#N). Such configuration/rule may be defined to be restrictively applied to a case in which DIFF_CC is a neighbor cell (and/or a serving cell and/or a different PLMN (UL) carrier).

Example 6-6

In the above examples (e.g., example 6-1, example 6-2, example 6-3 and example 6-4), i) DL SFs of DL CCs selected or designated on the basis of the above examples, at least some (i.e., some or all) of which overlap with the region from "the starting SF−1 in the DIFF_CC discovery pool" to "the ending SF+1 in the DIFF_CC discovery pool" in the time resource region, are assumed as INV_DL SFs (or DL gaps) and/or ii) DL SFs of DL CCs selected or designated on the basis of the above examples, at least some (i.e., some or all) of which overlap with the region from "SF#N−1" to "SF#N+1" in the time resource region, are assumed as INV_DL SFs (or DL gaps) (i.e., when a DIFF_CC D2DSS resource is configured in serving-cell SF#N). Such configuration may be defined to be restrictively applied to a case in which DIFF_CC is a serving cell (and/or a neighbor cell and/or a different PLMN (UL) carrier).

Example 6-7

Information about at least one of i) whether (some or all of) the above-described examples (e.g., example 6-1, example 6-2, example 6-3, example 6-4, example 6-5 and example 6-6) are applied, ii) which one of the above-described examples is applied to which (serving) cell, iii) whether INV_DL SFs (or DL gaps) are configured due to D2D discovery signal reception on a different (UL) carrier at an inter-frequency, and iv) whether INV_DL SFs (or DL gaps) are configured due to D2D discovery signal reception on a different PLMN (UL) carrier may be signaled by a serving eNB/D2D UE to (other) D2D UEs through predefined signaling (e.g., SIB, (dedicated) RRC or PD2DSCH) or may be predefined.

As another example, the above-described examples (e.g., example 6-1, example 6-2, example 6-3, example 6-4, example 6-5 and example 6-6) may be extended and applied when the SHRXCH_D2D RX UE (or SRXCH_D2D RX UE) performs D2D communication signal (e.g., SA and D2D data) reception on DIFF_CC.

As another example, when a paired DL CC of DIFF_CC is present (e.g., D2D discovery signal reception on a different (UL) carrier at an inter-frequency is performed) and the SHRXCH_D2D RX UE (or SRXCH_D2D RX UE) performs D2D discovery signal reception in DIFF_CC in the above-described examples (e.g., example 6-1, example 6-2, example 6-3, example 6-4, example 6-5 and example 6-6), INV_DL SFs (or DL gaps) (based on the above-described rule) may be configured on the paired DL CC i) all the time or ii) only when configuration of INV_DL SFs (or DL gaps) is enabled.

Example 6-8

Information on INV_DL SFs (or DL gaps) configured when the SHRXCH_D2D RX UE (or SRXCH_D2D RX UE) performs D2D discovery signal reception on DIFF_CC may be designated or signaled in the form of a bitmap. Here, a (serving) cell to which the information needs to be applied may be signaled by the serving eNB (or D2D UE) to (other) D2D UEs through predefined additional signaling (e.g., SIB, (dedicated) RRC or PD2DSCH), may be preset, or may be selected on the basis of (previously defined or signaled) at least some (i.e., some or all) of the above-described rules (e.g., example 6-1, example 6-2, example 6-3, example 6-4, example 6-5 and example 6-6).

Examples of the above-described proposed methods can be included as one of methods realized by the present invention and thus can be considered as proposed methods. Further, while the aforementioned proposed methods may be independently realized, some proposed methods may be combined/merged.

The above-described proposed methods may be restrictively applied to FDD system and/or TDD system environments.

The above-described proposed methods may be restrictively applied to mode-2 communication and/or type-1 discovery (and/or mode-1 communication and/or type-2 discovery).

The above-described proposed methods may be restrictively applied only when a D2D RX UE receives neighbor cell related synchronization error information of inter-cell discovery signal (and/or neighbor cell discovery signal) reception related W1.

In addition, the above-described proposed methods may be restrictively applied to at least one of an in-coverage D2D UE, an out-coverage D2D UE and an RRC_connected D2D UE and an RRC_idle D2D UE.

Furthermore, the above-described proposed methods may be restrictively applied to a D2D UE performing only D2D discovery (transmission/reception) operation (and/or a D2D UE performing only D2D communication (transmission/reception)).

Moreover, the above-described proposed methods may be restrictively applied to a scenario in which only D2D discovery is capable/set (and/or a scenario in which only D2D communication is capable/set).

Further, the CEILING(X) function (i.e., function of deriving a minimum integer greater than or equal to X) may be replaced by FLOOR(X) function (i.e., function of deriving a maximum integer less than or equal to X) in the above-described proposed methods.

Further, the above-described proposed methods may be restrictively applied to an SHRXCH_D2D RX UE (and/or a SRXCH_D2D RX UE).

In addition, the above-described proposed methods may be restrictively applied to a situation in which carrier aggregation (CA) is applied or a situation in which CA is not applied.

Furthermore, the above-described proposed methods may be restrictively applied to a case in which D2D discovery signal reception in other (UL) carriers at an inter-frequency is performed and/or a case in which D2D discovery signal reception in other PLMN (UL) carriers based on inter-PLMN is performed.

Figure 15:
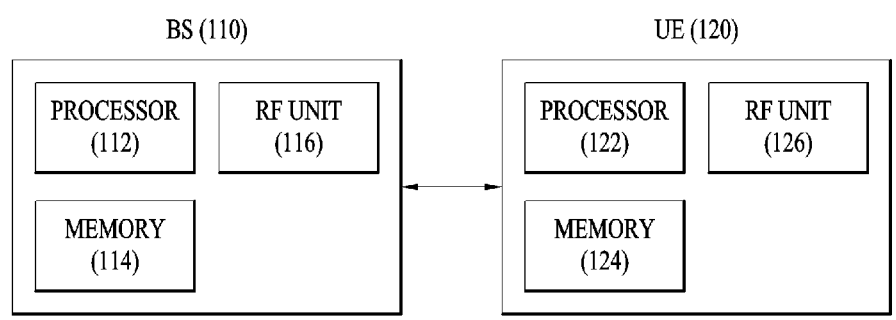
FIG. 15 illustrates a BS and a UE applicable to an embodiment of the present invention.

FIG. 15 illustrates a base station (BS) and a UE applicable to an embodiment of the present invention.

When a wireless communication system includes a relay, communication is performed between a BS and the relay on a backhaul link and communication is performed between the relay and a UE on an access link. Accordingly, the BS or UE shown in the figure may be replaced by the relay as necessary.

Referring to FIG. 15, a wireless communication system includes a BS 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 and stores various types of information related to operations of the processor 112. The RF unit 116 is connected to the processor 112 and transmits and/or receives radio signals. The UE 120 includes a processor 122, a memory 124 and a radio frequency (RF) unit 126. The processor 122 may be configured to implement the procedures and/or methods proposed by the present invention. The memory 124 is connected to the processor 122 and stores various types of information related to operations of the processor 122. The RF unit 126 is connected to the processor 122 and transmits and/or receives radio signals. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term, fixed station, Node B, eNode B (eNB), access point, etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASIC s), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor.

The memory unit may be located at the interior or exterior of the processor and may transmit data to and receive data from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While examples in which the D2D signal transmission/reception method in a wireless communication system are applied to 3GPP LTE have been described, the present invention is applicable to various wireless communication systems in addition to 3GPP LTE.

The invention claimed is:

1. A method of receiving a device-to-device (D2D) signal by a user equipment (UE) in a wireless communication system, the method comprising:
   receiving, from a base station, information for configuring at least one downlink subframe as a gap for the D2D signal;
   prioritizing, by the UE, reception of the D2D signal over a wide area network (WAN) downlink signal based on the D2D signal being overlapped with the WAN downlink signal on a downlink subframe and the downlink subframe being configured as the gap; and
   prioritizing, by the UE, reception of the WAN downlink signal over the D2D signal based on the D2D signal being overlapped with the WAN downlink signal on the downlink subframe and the downlink subframe not being configured as the gap.

2. The method according to claim 1, wherein the gap is configured to the at least one downlink subframe overlapping a D2D signal resource pool for receiving the D2D signal, and wherein the method further comprises switching between a downlink operation and a D2D operation.

3. The method according to claim 1, wherein the D2D signal is a discovery signal, a D2D Synchronization Signal (D2DSS), a D2D data signal, or a scheduling assignment signal.

4. The method according to claim 1, wherein the WAN downlink signal is a Physical Downlink Control Channel (PDCCH), Physical Downlink Shared Channel (PDSCH), Cell specific Reference Signal (CRS), or Channel State Information-Reference Signal (CSI-RS).

5. The method according to claim 1, wherein the UE has limited reception capabilities.

6. The method according to claim 1, wherein based on the UE prioritizing reception of the D2D signal over the WAN downlink signal within the gap, the UE does not receive the WAN downlink signal, and wherein based on the UE prioritizing reception of the WAN downlink signal over the D2D signal outside the gap, the UE does not receive the D2D signal.

7. An apparatus for receiving a device-to-device (D2D) signal by a user equipment (UE) in a wireless communication system, the apparatus comprising:

a transceiver; and a processor coupled to the transceiver and configured to:

control the transceiver to receive, from a base station, information for configuring at least one downlink subframe as a gap for the D2D signal, wherein the processor prioritizes reception of the D2D signal over a wide area network (WAN) downlink signal based on the D2D signal being overlapped with the WAN downlink signal on a downlink subframe and the downlink subframe being configured as the gap, and wherein the processor prioritizes reception of the WAN downlink signal over the D2D signal based on the D2D signal being overlapped with the WAN downlink signal on the downlink subframe and the downlink subframe not being configured as the gap.

8. The apparatus according to claim 7, wherein the gap is configured to the at least one downlink subframe overlapping a D2D signal resource pool for receiving the D2D signal, and wherein the method further comprises switching between a downlink operation and a D2D operation.

9. The apparatus according to claim 7, wherein the D2D signal is a discovery signal, a D2D Synchronization Signal (D2DSS), a D2D data signal, or a scheduling assignment signal.

10. The apparatus according to claim 7, wherein the WAN downlink signal is a Physical Downlink Control Channel (PDCCH), Physical Downlink Shared Channel (PDSCH), Cell specific Reference Signal (CRS), or Channel State Information-Reference Signal (CSI-RS).

11. The apparatus according to claim 7, wherein the UE has limited reception capabilities.

12. The apparatus according to claim 7, wherein based on the UE prioritizing reception of the D2D signal over the WAN downlink signal within the gap, the UE does not receive the WAN downlink signal, and wherein based on the UE prioritizing reception of the WAN downlink signal over the D2D signal outside the gap, the UE does not receive the D2D signal.

* * * * *